US012599991B2

(12) United States Patent
Chen et al.

(10) Patent No.: US 12,599,991 B2
(45) Date of Patent: Apr. 14, 2026

(54) WELDING METHOD, WELDING APPARATUS, WELDING DEVICE, AND BATTERY CELL

(71) Applicant: CONTEMPORARY AMPEREX TECHNOLOGY (HONG KONG) LIMITED, Hong Kong (CN)

(72) Inventors: Jianyun Chen, Ningde (CN); Shiyuan Lian, Ningde (CN); Chunyang Peng, Ningde (CN); Zeyuan Yin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/622,119

(22) Filed: Mar. 29, 2024

(65) Prior Publication Data

US 2024/0253169 A1     Aug. 1, 2024

Related U.S. Application Data

(63) Continuation of application No. PCT/CN2023/073962, filed on Jan. 31, 2023.

(51) Int. Cl.
*B23K 37/04* (2006.01)
*B23K 101/36* (2006.01)
(Continued)

(52) U.S. Cl.
CPC ...... *B23K 37/0443* (2013.01); *B23K 37/0452* (2013.01); *H01M 50/103* (2021.01);
(Continued)

(58) Field of Classification Search
CPC ............ B23K 37/0443; B23K 37/0452; B23K 2101/36; B23K 26/206; H01M 50/103; H01M 50/15; H01M 50/169
See application file for complete search history.

(56) References Cited

U.S. PATENT DOCUMENTS

2012/0160815 A1* 6/2012 Hayashimoto ......... B23K 26/32
                                                            219/121.64
2022/0134491 A1 5/2022 Inoue et al.
2022/0388095 A1 12/2022 Zeng et al.

FOREIGN PATENT DOCUMENTS

CN          2859815 Y      1/2007
CN      105149761 A     12/2015
(Continued)

OTHER PUBLICATIONS

The European Patent Office (EPO) The Extended European Search Report for Application No. 23875912.0 Jan. 3, 2025 6 Pages.
(Continued)

*Primary Examiner* — Steven W Crabb
*Assistant Examiner* — Dilnessa B Belay
(74) *Attorney, Agent, or Firm* — ANOVA LAW GROUP, PLLC

(57) ABSTRACT

A welding method includes placing a housing covered with an end cap into a jig, where a clearance structure is created on the jig and available for exposing a target weld zone between the end cap and the housing, and the target weld zone includes a first target weld zone section and a second target weld zone section located on two opposite sides of the end cap respectively; and moving the jig to a first welding station of a welding device; welding, by a first welding head of the welding device, the first target weld zone section through the clearance structure; and welding, by a second welding head of the welding device, the second target weld zone section through the clearance structure. The first welding station is located between the first welding head and the second welding head.

12 Claims, 10 Drawing Sheets

1000

(51) Int. Cl.
 *H01M 50/103* (2021.01)
 *H01M 50/15* (2021.01)
 *H01M 50/169* (2021.01)

(52) U.S. Cl.
 CPC ......... *H01M 50/15* (2021.01); *H01M 50/169*
 (2021.01); *B23K 2101/36* (2018.08)

(56) References Cited

FOREIGN PATENT DOCUMENTS

| | | | | | |
|---|---|---|---|---|---|
| CN | 110102936 | A | * | 8/2019 | ............ B23K 31/02 |
| CN | 113299999 | A | | 8/2021 | |
| CN | 114799520 | A | | 7/2022 | |
| CN | 217306721 | U | | 8/2022 | |
| CN | 115476041 | A | | 12/2022 | |
| CN | 218215496 | U | | 1/2023 | |
| JP | 2012043714 | A | | 3/2012 | |

OTHER PUBLICATIONS

The World Intellectual Property Organization (WIPO) International Search Report for PCT/CN2023/073962 Oct. 22, 2023 12 Pages (including translation).
The European Patent Office (EPO) Communication pursuant to Article 94(3) EPC for Application No. 23875912.0 Nov. 13, 2025 5 Pages.

* cited by examiner

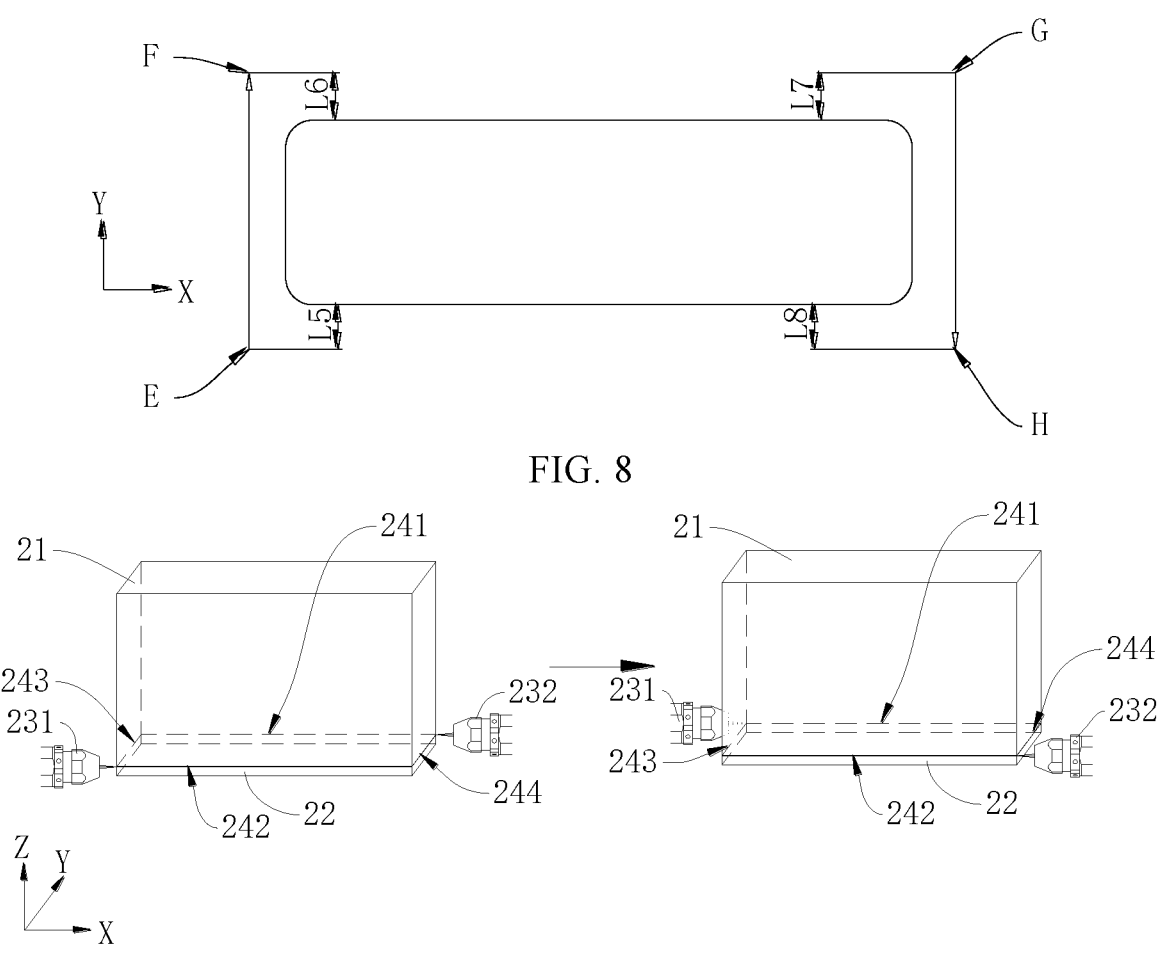
FIG. 8
FIG. 9
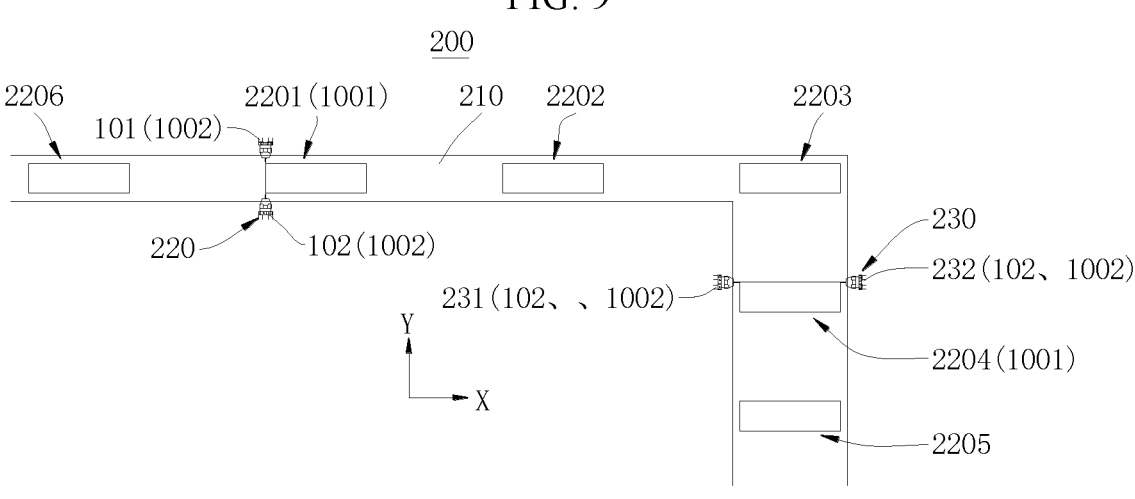
FIG. 10

WELDING METHOD, WELDING APPARATUS, WELDING DEVICE, AND BATTERY CELL

CROSS-REFERENCE TO RELATED APPLICATION

This application is a continuation of International Application No. PCT/CN2023/073962, filed on Jan. 31, 2023, the entire content of which is incorporated herein by reference.

TECHNICAL FIELD

This application relates to the field of welding technology, and in particular, to a welding method, a welding apparatus, a welding device, and a battery cell.

BACKGROUND

With the rapid development of the battery industry, the requirements on the production efficiency of batteries are increasingly higher, and higher requirements are also imposed on a welding process in the production of batteries. A most important process in the welding process of batteries is the welding and sealing between a housing and an end cap. During the welding, an electrode assembly that carries the end cap part is loaded into the housing, and then the circumference of the end cap and the circumference of the housing at the opening of the housing are welded together, so that the housing and the end cap form a whole. However, the efficiency of welding between the end cap and the housing is low, and is unable to meet the requirement of higher production efficiency.

SUMMARY

An objective of this application is to provide a weld method, a welding apparatus, a welding device, and a battery cell to solve at least the problem of low efficiency of welding between an end cap and a housing.

A technical solution disclosed in an embodiment of this application is as follows:

According to a first aspect, a welding method is provided, including the following steps:

placing a housing covered with an end cap into a jig, where a clearance structure is created on the jig and available for exposing a target weld zone between the end cap and the housing, and the target weld zone includes a first target weld zone section and a second target weld zone section located on two opposite sides of the end cap respectively; and moving the jig to a first welding station of a welding device; welding, by a first welding head of the welding device, the first target weld zone section through the clearance structure; and welding, by a second welding head of the welding device, the second target weld zone section through the clearance structure, where the first welding station is located between the first welding head and the second welding head.

In the welding method according to this embodiment of this application, the housing covered with an end cap is mounted into the jig first, and then the jig and the housing are moved to the first welding station. At the same time, the first welding head and the second welding head are positioned on two opposite sides of the jig. Subsequently, the first welding head and the second welding head weld the first target weld zone section and the second target weld zone section respectively through the clearance structure. In this way, the two opposite sides of the end cap are welded. This welding method is more efficient than the method of welding around the end cap.

In an embodiment, the target weld zone includes a plurality of target weld zone sections. One welding head is disposed corresponding to each target weld zone section. The plurality of target weld zone sections are connected in tandem and come together on all sides to form a ring structure. Two of the plurality of target weld zone sections are the first target weld zone section and the second target weld zone section respectively. The welding head corresponding to the first target weld zone section is the first welding head. The welding head corresponding to the second target weld zone section is the second welding head.

In the welding method according to this embodiment of this application, each welding head welds a corresponding target weld zone section in one-to-one correspondence, thereby welding the end cap to the housing for a complete circle, and making the end cap completely seal the inner space of the housing. In addition, the end cap is welded to the housing in different sections by a plurality of welding heads, thereby achieving high welding efficiency.

In an embodiment, welding directions of two welding heads corresponding to a pair of opposite target weld zone sections among the plurality of target weld zone sections are opposite to each other.

In the welding method according to this embodiment of this application, the welding directions of the two welding heads corresponding to a pair of opposite target weld zone sections are opposite to each other. In this way, in the pair of opposite target weld zone sections, the welding start point and the welding end point of one target weld zone section are opposite to the welding start point and the welding end point of the other target weld zone section respectively, thereby reducing the risk of terminating the welding of different target weld zone sections at the same position, and improving the welding quality.

In an embodiment, in any two adjacent target weld zone sections among the plurality of target weld zone sections, a welding start point of one target weld zone section is connected to a welding end point of the other target weld zone section.

In the welding method according to this embodiment of this application, in any two adjacent target weld zone sections among the plurality of target weld zone sections, the welding start point of one target weld zone section is connected to the welding end point of the other target weld zone section, thereby avoiding coincidence of the welding end points of all target weld zone sections, improving the welding quality, and improving the performance of sealing between the end cap and the housing.

In an embodiment, welding directions of two welding heads corresponding to a pair of opposite target weld zone sections among the plurality of target weld zone sections are identical.

In the welding method according to this embodiment of this application, the welding directions of the two welding heads corresponding to a pair of opposite target weld zone sections among the plurality of target weld zone sections are identical, thereby making the welding operation simple and easy to implement.

In an embodiment, at least one welding head welds a corresponding target weld zone section along a first direction and then welds the corresponding target weld zone section along a reverse direction.

In the welding method according to this embodiment of this application, the welding head welds the corresponding target weld zone section along the first direction, and then welds the target weld zone section along the reverse direction. In this way, among the two ends of the target weld zone section, one end is a welding start point along the first direction, and the other end is a welding start point of the reverse welding, thereby reducing the risk that the welding end points of the two adjacent target weld zone sections connected together coincide at the same position, and improving the welding quality. In addition, if a welding start point is connected to a welding end point, the welding material at the welding start point will accumulate in a molten pool at the welding end point, thereby improving the welding quality.

In an embodiment, a welding stop position is created in the target weld zone section. The welding head stops welding at the welding stop position after welding from one end of the target weld zone section to the welding stop position along the first direction, and then the welding head welds along the reverse direction to complete welding of an unwelded region on the target weld zone section.

The welding method according to this embodiment of this application makes one end of the target weld zone section serve as a welding start point of welding by the welding head along the first direction, and makes the other end of the target weld zone section serve as a welding start point of welding along the reverse direction. In this way, both ends of the target weld zone section serve as welding start points, thereby reducing the risk that the welding end points of the two adjacent target weld zone sections connected together coincide at the same position, and improving the welding quality.

In an embodiment, the welding head continues to weld along a reversed direction after moving to the welding stop position during welding along the reverse direction.

In the welding method according to this embodiment of this application, the welding head continues to weld along a reversed direction after moving to the welding stop position during welding along the reverse direction. In this way, the welding is performed twice near the welding stop position to form two weld seams. The two weld seams are stacked near the welding stop position, thereby improving the welding quality of the two weld seams at the junction, and improving the overall welding quality of the target weld zone section.

In an embodiment, the target weld zone further includes a third target weld zone section and a fourth target weld zone section located on two other opposite sides of the end cap. The first target weld zone section includes a first end and a second end opposite to each other. The second target weld zone section includes a third end and a fourth end opposite to each other. The third target weld zone section is connected between the first end and the third end. The fourth target weld zone section is connected between the second end and the fourth end.

The welding device further includes a third welding head and a fourth welding head, and a second welding station is formed between the third welding head and the fourth welding head.

The welding method further includes: moving the jig to the second welding station; welding, by the third welding head, the third target weld zone section through the clearance structure; and welding, by the fourth welding head, the fourth target weld zone section through the clearance structure.

In the welding method according to this embodiment of this application, the first welding head and the second welding head implement the welding of the end cap and the housing on the two opposite sides respectively, and the third welding head and the fourth welding head implement the welding of the end cap and the housing on the two other opposite sides respectively, thereby welding the end cap to the housing for a complete circle, and making the end cap completely seal the inner space of the housing.

In an embodiment, the first welding head welds the first target weld zone section along a distribution direction from the first end toward the second end, and the second welding head welds the second target weld zone section along a distribution direction from the fourth end toward the third end.

The third welding head welds the third target weld zone section along a distribution direction from the third end toward the first end, and the fourth welding head welds the fourth target weld zone section along a distribution direction from the second end toward the fourth end.

In the welding method according to this embodiment of this application, during welding, the first welding head performs welding from the first end to the second end, the fourth welding head performs welding from the second end to the fourth end, the second welding head performs welding from the fourth end to the third end, and the third welding head performs welding from the third end to the fourth end. In this way, the first end, the second end, the third end, and the fourth end each are the welding start point of one welding head and the welding end point of another welding head, thereby preventing the welding process from terminating at the same position, reducing the risk of welding defects, and improving the welding quality.

In an embodiment, the first welding head welds the first target weld zone section along a distribution direction from the first end toward the second end, and the second welding head welds the second target weld zone section along a distribution direction from the third end toward the fourth end.

The third welding head welds the third target weld zone section along a distribution direction from the first end toward the third end, and the fourth welding head welds the fourth target weld zone section along a distribution direction from the second end toward the fourth end.

In the welding method according to this embodiment of this application, during welding, the first welding head performs welding from the first end to the second end, the second welding head performs welding from the third end to the fourth end, the third welding head performs welding from the first end to the third end, and the fourth welding head performs welding from the second end to the fourth end, thereby welding the end cap to the housing for a complete circle. In addition, the welding direction of the first welding head is identical to the welding direction of the second welding head, and the welding direction of the third welding head is identical to the welding direction of the fourth welding head, so that the welding operation is simpler and easier to implement.

In an embodiment, after welding the second target weld zone section along a distribution direction from the third end toward the fourth end, the second welding head welds the second target weld zone section toward the third end along a reverse direction; and/or, after welding the fourth target weld zone section along a distribution direction from the second end toward the fourth end, the fourth welding head welds the fourth target weld zone section toward the second end along a reverse direction.

In the welding method according to this embodiment of this application, by means of the reverse welding, the welding material accumulates at the fourth end, thereby reducing the risk of an insufficient molten pool, and improving the welding quality at the fourth end.

According to a second aspect, a welding apparatus is provided, including a first welding head, a second welding head, and a jig. The jig is configured to carry a housing covered with an end cap. A clearance structure is created on the jig and available for exposing a target weld zone between the end cap and the housing.

A welding station is formed between the first welding head and the second welding head.

When the jig is located in the welding station, the first welding head and the second welding head weld target weld zone sections in the target weld zone through the clearance structure respectively, where the target weld zone sections are located on two opposite sides of the end cap respectively.

In the welding apparatus according to this embodiment of this application, during welding, the housing covered with an end cap is fixed in the jig first. At this time, the first welding head and the second welding head are located on two opposite sides of the housing covered with the end cap respectively. Subsequently, the first welding head and the second welding head weld the target weld zone sections on the two opposite sides of the housing covered with the end cap, respectively, thereby implementing concurrent welding of the two opposite sides of the housing covered with the end cap, and improving the welding efficiency.

In an embodiment, the welding apparatus further includes a first moving piece. The first moving piece is connected to the first welding head and configured to drive the first welding head to move relative to the jig so as to cause the first welding head to weld a corresponding target weld zone section.

The welding apparatus further includes a second moving piece. The second moving piece is connected to the second welding head and configured to drive the second welding head to move relative to the jig so as to cause the second welding head to weld a corresponding target weld zone section.

In the welding apparatus according to this embodiment of this application, the first moving piece and the second moving piece drive the first welding head and the second welding head to move, respectively. The overall structure of the welding apparatus is simple, and the welding apparatus is easy to process and manufacture.

In an embodiment, the welding apparatus further includes a clamping mechanism. The clamping mechanism is located at the welding station and configured to clamp and fix the housing.

In the welding apparatus according to this embodiment of this application, the clamping mechanism can implement the positioning of the housing, and enable the first welding head and the second welding head to accurately weld the corresponding target weld zone section, thereby improving the welding precision.

In an embodiment, the clamping mechanism includes a fixing plate as well as a first side plate and a second side plate connected to the fixing plate. The first side plate, the second side plate, and the fixing plate come together on all sides to form a clamping slot; and the clamping slot is configured to clamp the housing.

In the welding apparatus according to this embodiment of this application, the clamping mechanism is simple in structure, and the welding apparatus is easy to manufacture and process.

In an embodiment, the first side plate is located between the first welding head and the jig, and the second side plate is located between the second welding head and the jig.

In the welding apparatus according to this embodiment of this application, the housing can be positioned between the first welding head and the second welding head by means of the first side plate and the second side plate. In this way, the spacing between the first welding head and the corresponding target weld zone section as well as the spacing between the second welding head and the corresponding target weld zone section fall within an appropriate range, and the welding quality is good.

In an embodiment, the welding apparatus further includes a moving mechanism. The moving mechanism is configured to drive the jig to move, so as to cause the first welding head to weld a corresponding target weld zone section and cause the second welding head to weld a corresponding target weld zone section.

In the welding apparatus according to this embodiment of this application, in an actual welding process, the first welding head and the second welding head can implement the welding directly without stopping the jig, thereby greatly improving the welding efficiency. In addition, during welding, the first welding head is stationary relative to the second welding head, without a need to move, thereby improving the accuracy of the welding position, and improving the welding precision.

In an embodiment, the moving mechanism includes a first conveyor belt assembly and a second conveyor belt assembly that are spaced apart. The first conveyor belt assembly and the second conveyor belt assembly are able to clamp the housing and cause the housing to move as conveyed by the first conveyor belt assembly and the second conveyor belt assembly.

In the welding apparatus according to this embodiment of this application, the first conveyor belt assembly and the second conveyor belt assembly are able to clamp the housing, and facilitate positioning of the housing, thereby improving the welding precision.

In an embodiment, a pressing plate and a receptacle for accommodating the housing covered with the end cap are created on the jig. The pressing plate is located at an opening of the receptacle and pressed against the housing to push the housing toward the end cap so as to press and fix the end cap to the housing.

In the welding apparatus according to this embodiment of this application, the pressing plate presses and fixes the housing to the housing. The end cap and the housing can be stably fixed together, thereby avoiding a need of a pre-welding operation, and improving the welding efficiency.

According to a third aspect, a welding device is provided, including the foregoing welding apparatus.

The welding device according to an embodiment of this application employs the foregoing welding apparatus. The welding apparatus is highly efficient, and can improve the welding efficiency of the welding device.

In an embodiment, the welding device includes a conveyance apparatus, a first welding apparatus, and a second welding apparatus.

The first welding apparatus is the foregoing welding apparatus. The welding station in the first welding apparatus is a first welding station. The first welding head in the first welding apparatus and the second welding head in the first welding apparatus are able to weld the target weld zone sections located on two opposite sides of the end cap, respectively.

The second welding apparatus is the foregoing welding apparatus. The welding station in the second welding apparatus is a second welding station. The first welding head in the second welding apparatus and the second welding head in the second welding apparatus are able to weld the target weld zone sections located on two other opposite sides of the end cap, respectively.

The conveyance apparatus is able to move the jig from the first welding station to the second welding station.

In the welding device according to this embodiment of this application, the first welding head and the second welding head in the first welding apparatus weld the two opposite sides of the end cap simultaneously, and the first welding head and the second welding head in the second welding apparatus weld the two other opposite sides of the end cap respectively, so that the welding efficiency is high.

According to a fourth aspect, a battery cell is provided. The battery cell includes a housing and an end cap. The end cap covers and fits the housing. The end cap is welded to the housing by using the foregoing welding method.

In the battery cell according to an embodiment of this application, the end cap and the housing are welded together by the above welding method. The welding efficiency is high, thereby improving the production efficiency of the battery cell and reducing the manufacturing cost.

BRIEF DESCRIPTION OF DRAWINGS

To describe the technical solutions in some embodiments of this application more clearly, the following outlines the drawings to be used in the description of some exemplary embodiments of this application. Evidently, the drawings outlined below are merely some embodiments of this application. A person of ordinary skill in the art may derive other drawings from such drawings without making any creative efforts.

FIG. 8 is a schematic diagram of welding at a second welding station shown in FIG. 5;

FIG. 9 is a flowchart of welding at a second welding station shown in FIG. 5;

FIG. 10 is a schematic structural diagram of a welding device according to another embodiment of this application;

Figure 1:
FIG. 1 is a schematic structural diagram of a vehicle according to an embodiment of this application.
Figure 1:
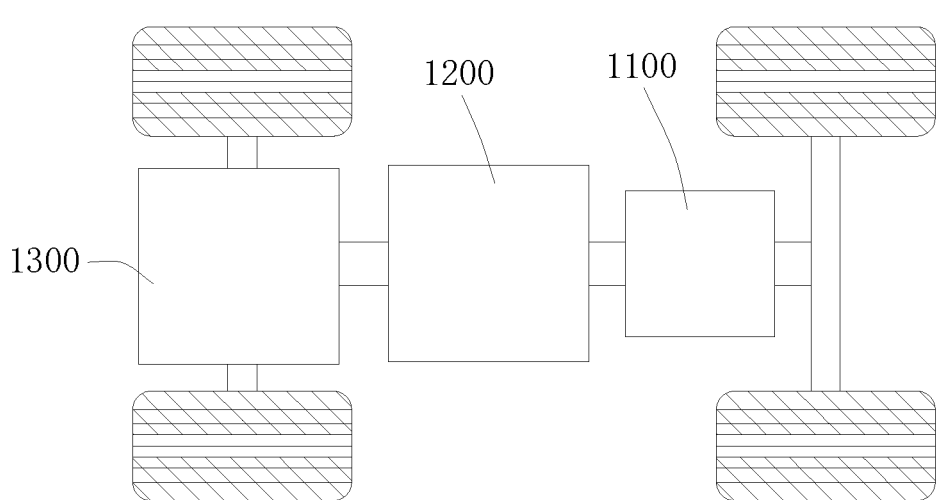

LIST OF REFERENCE NUMERALS 1000. vehicle; 1100. battery; 1200. controller; 1300. motor; 10. box; 11. first part; 12. second part; 20. battery cell; 21. housing; 22. end cap; 221. electrode terminal; 222. pressure relief mechanism; 23. electrode assembly; 24. target weld zone; 241. first target weld zone section; 242. second target weld zone section; 243. third target weld zone section; 244. fourth target weld zone section; 240. target weld zone section;
100. welding apparatus; 1001. welding station; 1002. welding head; 101. first welding head; 102. second welding head; 103. jig; 1031. first sub-jig; 10311. pressing plate; 10312. receptacle; 1032. clearance structure; 10321. first clearance sub-structure; 104. first moving piece; 105. second moving piece; 106. clamping mechanism; 1061. fixing plate; 1062. first side plate; 1063. second side plate; 1064. clamping slot; 107. moving mechanism; 1071. first conveyor belt assembly; 1072. second conveyor belt assembly; 108. first driving piece; 109. second driving piece; 110. third driving piece; 111. fourth driving piece;
200. welding device; 210. conveyance apparatus; 220. first welding apparatus; 230. second welding apparatus; 231. third welding head; 232. fourth welding head; 2201. first welding station; 2202. first trimming station; 2203. transit station; 2204. second welding station; 2205. second trimming station; 2206. assembling station.

DETAILED DESCRIPTION OF EMBODIMENTS

The following describes some embodiments of this application in detail. Examples of the embodiments are shown in the drawings, throughout which the same or similar reference numerals represent the same or similar components or the components of the same or similar functions. The embodiments described below with reference to the drawings are exemplary, and are intended to construe this application but not to limit this application.

Understandably, in the description of this application, a direction or positional relationship indicated by the terms such as "length", "width", "up", "down", "front", "back", "left", "right", "vertical", "horizontal", "top", "bottom", "in", and "out" is a direction or positional relationship based on the illustration in the drawings, and is merely intended for ease or brevity of description of this application, but does not necessarily mean or imply that the indicated device or component is located in the specified direction or constructed or operated in the specified direction. Therefore, such terms are not to be understood as a limitation on this application.

In addition, the technical terms such as "first" and "second" are used merely for ease of description, but not to indicate or imply relative importance or implicitly specify the number of technical features mentioned. Therefore, a feature defined with "first" or "second" may explicitly or implicitly include one or more of the features. In the description of this application, unless otherwise expressly specified, "a plurality of" means two or more.

In this application, unless otherwise expressly specified and defined, the terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art is able to understand the specific meanings of the terms in this application according to specific situations.

It is hereby noted that, in the description of this application, the term "and/or" merely indicates a relationship between related items, and represents three possible relationships. For example, "A and/or B" may represent the following three circumstances: A alone, both A and B, and B alone.

Further, it is hereby noted that in embodiments of this application, the same component or the same part is denoted by the same reference numeral in the accompanying drawings. For identical components or parts in embodiments of this application, the drawings may illustrate the reference numeral of only one of the components or parts as an example. Understandably, the reference numeral is equally applicable to other identical components or parts.

In this application, the terms "one embodiment", "an embodiment", "some embodiments", "example", "specific example", "some examples", and the like mean that a particular feature, structure, material, or characteristic described in conjunction with the embodiment or example is included in at least one embodiment or example of this application. In this embodiment, the appearances of such terms are not necessarily referring to the same embodiment or example. Furthermore, the particular features, structures, materials, or characteristics may be combined in any suitable manner in one or more embodiments. In addition, a person skilled in the art can integrate or combine different embodiments or examples as well as the features of different embodiments or examples described herein to the extent that they do not contradict each other.

In this application, for ease of description, the Z-axis in the drawings represents an up-down direction, the positive direction of the Z-axis represents an up direction, and the negative direction of the Z-axis represents a down direction. The Y-axis in the drawings represents a front-back direction, the positive direction of the Y-axis represents a back direction, and the negative direction of the Y-axis represents a front direction. The X-axis in the drawings represents a left-right direction, the positive direction of the X-axis represents a right direction, and the negative direction of the X-axis represents a left direction.

Currently, the market trend shows that batteries are applied more extensively. Batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for batteries keeps soaring with the increase of the application fields of the batteries.

With the rapid development of the battery industry, the requirements on the production efficiency of batteries are increasingly higher, and higher requirements are also imposed on a welding process in the production of batteries. A most important process in the welding process of a battery cell is the welding and sealing between a housing and an end cap. During the welding, an electrode assembly that carries the end cap part is loaded into the housing, and then the circumference of the end cap and the circumference of the housing at the opening of the housing are welded together, so that the housing and the end cap form a whole. However, the efficiency of welding between the end cap and the housing is low, and is unable to meet the requirement of higher production efficiency.

The applicant finds that a main reason for the low efficiency of welding between the housing and the end cap is that: in a process of welding between the housing and the end cap, after the end cap fits and covers the opening of the housing, the welding head needs to travel around the end cap for one circle, so as to weld the perimeter of the end cap and the perimeter of the opening of the housing together. This welding method is time-consuming and inefficient, restricts the improvement of the production efficiency, and reduces the production efficiency of the battery cell.

To enhance the efficiency of welding between the housing and the end cap, the applicant has designed a welding method after in-depth research. The welding method utilizes a first welding head and a second welding head to weld the housing and the end cap together from two opposite sides of the end cap respectively. This welding method is more efficient than the welding method in which the welding head needs to travel around the end cap for one circle.

Some embodiments of this application disclose a welding method, a welding apparatus, a welding device, a battery cell and battery manufactured by the foregoing welding method, and an electrical device that uses the battery as a power supply. The welding method is also applicable to welding between the end cap and the housing in other products. The electrical device may be, but is not limited to, a mobile phone, a tablet, a laptop computer, an electric toy, an electric tool, an electric power cart, an electric vehicle, a ship, a spacecraft, or the like. The electric toy may include stationary or mobile electric toys, such as a game console, an electric car toy, an electric ship toy, an electric airplane toy, and the like. The spacecraft may include an airplane, a rocket, a space shuttle, a spaceship, and the like.

For ease of description in the following embodiments, a vehicle 1000 is used as an example of the electrical device according to an embodiment of this application.

Referring to FIG. 1, FIG. 1 is a schematic structural diagram of a vehicle 1000 according to some embodiments of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 1100 is disposed inside the vehicle 1000. The battery 1100 may be disposed at the bottom, front, or rear of the vehicle 1000. The battery 1100 may be configured to supply power to the vehicle 1000. For example, the battery 1100 may serve as an operating power supply of the vehicle 1000. The vehicle 1000 may further include a controller 1200 and a motor 1300. The controller 1200 is configured to control the battery 1100 to supply power to the motor 1300, for example, to meet electrical energy requirements in starting, navigating, or running the vehicle 1000.

In some embodiments of this application, the battery 1100 serves not only as an operating power supply of the vehicle 1000, but may also serve as a driving power supply of the vehicle 1000 to provide driving power for the vehicle 1000 in place of or partly in place of fuel oil or natural gas.

Figure 2:
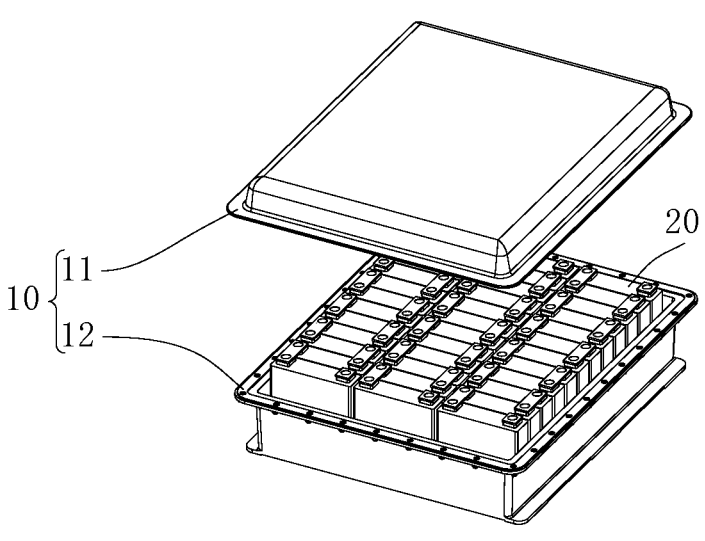
FIG. 2 is a schematic structural diagram of a battery according to an embodiment of this application.

Referring to FIG. 2, in an embodiment of the battery 1100, the battery 1100 includes a box 10 and a battery cell 20. The battery cell 20 is accommodated in the box 10. The box 10 is configured to provide an accommodation space for the battery cell 20. The box 10 may be in various structures. In some embodiments, the box 10 may include a first part 11 and a second part 12. The first part 11 and the second part 12 fit and cover each other. The first part 11 and the second part 12 together define an accommodation space configured to accommodate the battery cell 20. The second part 12 may be a hollow structure opened at one end. The first part 11 may be a plate-like structure. The first part 11 fits on an opening side of the second part 12 so that the first part 11 and the second part 12 together define the accommodation space. Alternatively, both the first part 11 and the second part 12 may be hollow structures opened at one side. The opening side of the first part 11 fits the opening side of the second part 12. Definitely, the box 10 formed by the first part 11 and the second part 12 may be in various shapes, such as a cylinder or a cuboid.

The battery 1100 may contain a plurality of battery cells 20. The plurality of battery cells 20 may be connected in series, parallel, or series-and-parallel pattern. The series-and-parallel pattern means a combination of series connection and parallel connection of the plurality of battery cells 20.

In an embodiment, the plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery 1100 in the form of battery modules first. A plurality of battery modules are then connected in series, parallel, or series-and-parallel pattern to form a whole for being accommodated in the box 10. The battery 1100 may further include other structures. For example, the battery 1100 may further include a busbar component. The busbar component is configured to implement electrical connection between the plurality of battery cells 20.

Each battery cell 20 may be, but is not limited to, a secondary battery or primary battery; or, may be a lithium-sulfur battery, a sodium-ion battery, or a magnesium-ion battery. The battery cell 20 may be in the shape such as a flat body, a cuboid, or another shape.

In another embodiment of the battery 1100, the battery 1100 does not include the box 10, but a plurality of battery cells 20 are electrically connected to form a whole by means of a necessary fixing structure, and then fitted into an electrical device.

Figures 3, 4:
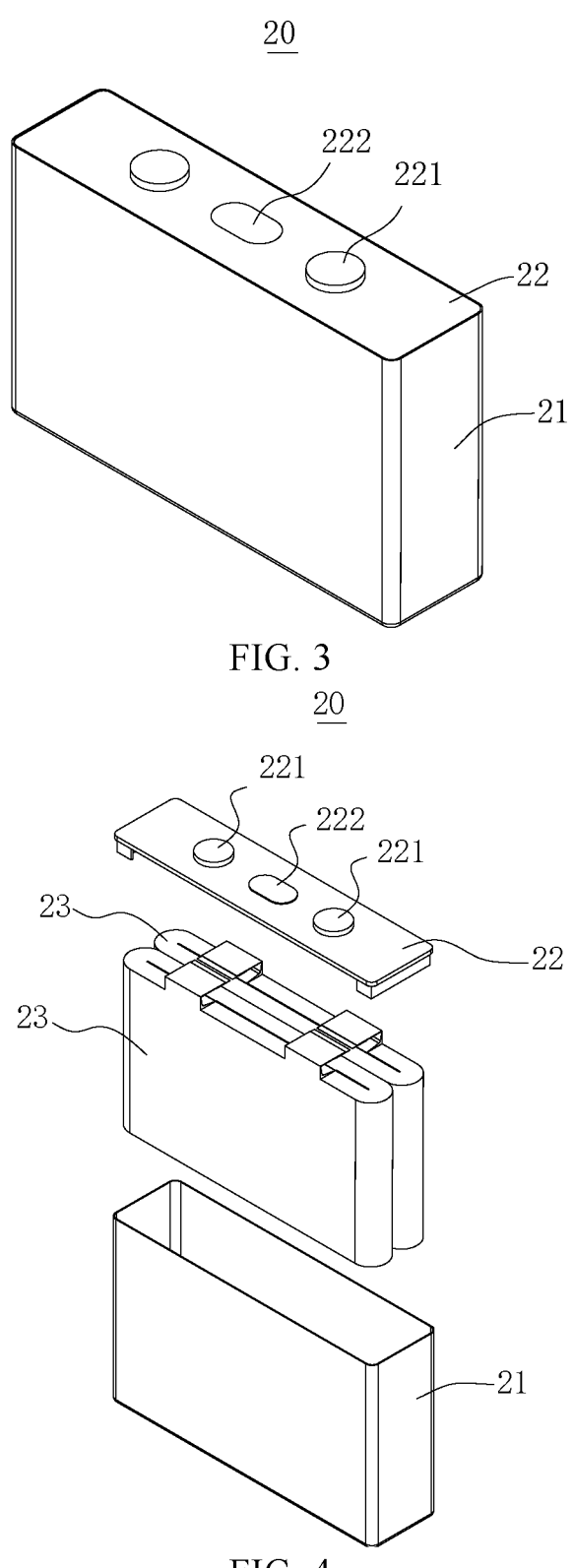
FIG. 3 is a schematic structural diagram of a battery cell according to an embodiment of this application.
FIG. 4 is a schematic exploded view of the battery cell shown in FIG. 3.

Referring to FIG. 3 and FIG. 4, FIG. 3 is a schematic structural diagram of a battery cell 20 according to some embodiments of this application, and FIG. 4 is a schematic exploded view of a battery cell 20 according to some embodiments of this application. The battery cell 20 is a minimum unit of a battery. As shown in FIG. 3, the battery cell 20 includes a housing 21, an end cap 22, an electrode assembly 23, and other functional components.

The end cap 22 is a component that fits and covers the opening of the housing 21 to isolate the internal environment of the battery cell 20 from the external environment. Not restrictively, the shape of the end cap 22 may be adapted to the shape of the housing 21 to fit the housing 21. Optionally, the end cap 22 may be made of a material of appropriate hardness and strength (such as aluminum alloy), so that the end cap 22 is not prone to deform when squeezed or impacted. In this way, the battery cell 20 achieves higher structural strength and higher safety performance. Functional components such as electrode terminals 221 may be disposed on the end cap 22. The electrode terminal 221 may be configured to be electrically connected to the electrode assembly 23 to output or input electrical energy of the battery cell 20. In some embodiments, a pressure relief mechanism 222 may be further disposed on the end cap 22, and is configured to relieve an internal pressure when the internal pressure or temperature of the battery cell 20 reaches a threshold. The end cap 22 may also be made of a variety of materials such as copper, iron, aluminum, stainless steel, aluminum alloy, or plastic, and the materials are not particularly limited herein. In some embodiments, an insulation piece may be further disposed on an inner side of the end cap 22. The insulation piece may be configured to isolate an electrically connected component in the housing 21 from the end cap 22 to reduce short-circuit risks. For example, the insulator may be plastic, rubber, or the like.

The housing 21 is a component configured to fit the end cap 22 to form an internal environment of the battery cell 20. The formed internal environment may be used to accommodate the electrode assembly 23, an electrolytic solution, and other components. The housing 21 and the end cap 22 may be stand-alone components. An opening may be made on the housing 21. At the opening, the end cap 22 fits with the opening to form the internal environment of the battery cell 20. Specifically, a common junction surface may be formed between the end cap 22 and the housing 21 first before other components are put into the housing. Subsequently, when the housing 21 needs to be internally sealed, the end cap 22 is made to fit and cover the housing 21. The housing 21 may be in various shapes and sizes, such as a cuboid or a hexagonal prism. Specifically, the shape of the housing 21 may depend on the specific shape and size of the electrode assembly 23. The housing 21 may be made of a variety of materials such as copper, iron, aluminum, stainless steel, aluminum alloy, or plastic, without being particularly limited herein.

The electrode assembly 23 is a component that reacts electrochemically in the battery cell 20. The housing 21 may contain one or more electrode assemblies 23. The electrode assembly 23 includes a positive electrode, a negative electrode, and a separator piece. During charge and discharge of a battery cell 20, active ions (such as lithium ions) are shuttled between the positive electrode and the negative electrode by intercalation and deintercalation. Disposed between the positive electrode and the negative electrode, the separator piece serves to reduce the probability of a short circuit between the positive electrode and the negative electrode and allow passage of the active ions.

In some embodiments, the positive electrode may be a positive electrode plate. The positive electrode plate may include a positive current collector and a positive active material disposed on at least one surface of the positive current collector.

In some embodiments, the negative electrode may be a negative electrode plate. The negative electrode plate may include a negative current collector and a negative active material disposed on at least one surface of the negative current collector.

In some embodiments, the separator piece is a separator. The type of the separator is not particularly limited in this application, and may be any well-known porous separator that is highly stable both chemically and mechanically.

In some embodiments, the electrode assembly 23 is a jelly-roll structure. The positive electrode plate and the negative electrode plate are wound into a jelly-roll structure.

In some embodiments, the electrode assembly 23 is a stacked structure.

Figure 5:
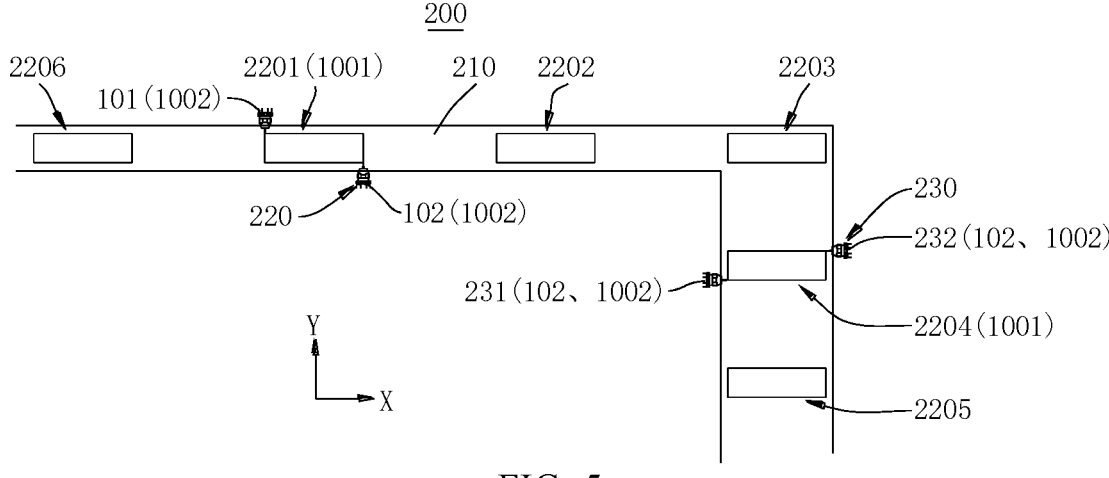
FIG. 5 is a schematic structural diagram of a welding device according to an embodiment of this application.
Figure 6:
FIG. 6 is a schematic diagram of welding at a first welding station shown in FIG. 5.

With reference to FIG. 3, FIG. 5, and FIG. 6, a welding method is provided in an embodiment of this application, and includes the following steps:

placing a housing 21 covered with an end cap 22 into a jig 103, where a clearance structure is created on the jig 103 and available for exposing a target weld zone 24 between the end cap 22 and the housing 21, and the target weld zone 24 includes a first target weld zone section 241 and a second target weld zone section 242 located on two opposite sides of the end cap 22 respectively; and moving the jig 103 to a first welding station 2201 of a welding device 200; welding, by a first welding head 101 of the welding device 200, the first target weld zone section 241 through the clearance structure; and welding, by a second welding head 102 of the welding device 200, the second target weld zone section 242 through the clearance structure, where the first welding station 2201 is located between the first welding head 101 and the second welding head 102.

The jig 103 means a component configured to accommodate and fix the housing 21 covered with the end cap 22. When the housing 21 covered with the end cap 22 is positioned in the jig 103, the end cap 22 is caused to be fixed relative to the housing 21, thereby facilitating subsequent welding operations.

The welding device 200 means a device capable of welding the end cap 22 and the housing 21 together. The welding device 200 may be a laser welding device, an electric welding device, a gas welding device, or the like.

The first welding head 101 means an actuating component for implementing welding in the welding device 200. The second welding head 102 means another actuating component for implementing welding in the welding device 200. For example, as shown in FIG. 5, the first welding head 101 and the second welding head 102 may be laser welding heads. Alternatively, in other embodiments, the first welding head 101 and the second welding head 102 may be electric welding heads or the like, and may be arranged depending on the actual welding needs, without being limited herein.

The housing 21 is covered with the end cap 22. Understandably, the end cap 22 fits and covers the opening of the housing 21. The perimeter of the end cap 22 needs to be welded to the perimeter of the opening of the housing 21 by one circle, so as to connect the end cap 22 and the housing 21 into a whole and seal the internal space formed around by the end cap 22 and the housing 21. The shape of the end cap 22 matches the shape of the opening of the housing 21 so that the opening of the housing 21 can be completely closed. The shape of the end cap 22 may be a regular shape such as a triangle, a quadrilateral, or a pentagon, or may be an irregular shape, without being limited herein. For example, as shown in FIG. 3 and FIG. 4, the end cap 22 may be the end cap 22 in the battery cell 20, and the housing 21 may be the housing 21 in the battery cell 20. After the end cap 22 covers and is welded to the housing 21, the housing is sealed, thereby reducing the risk of liquid leakage. The shape of the end cap 22 is a rectangle. The housing 21 is cuboidal.

Figure 7:
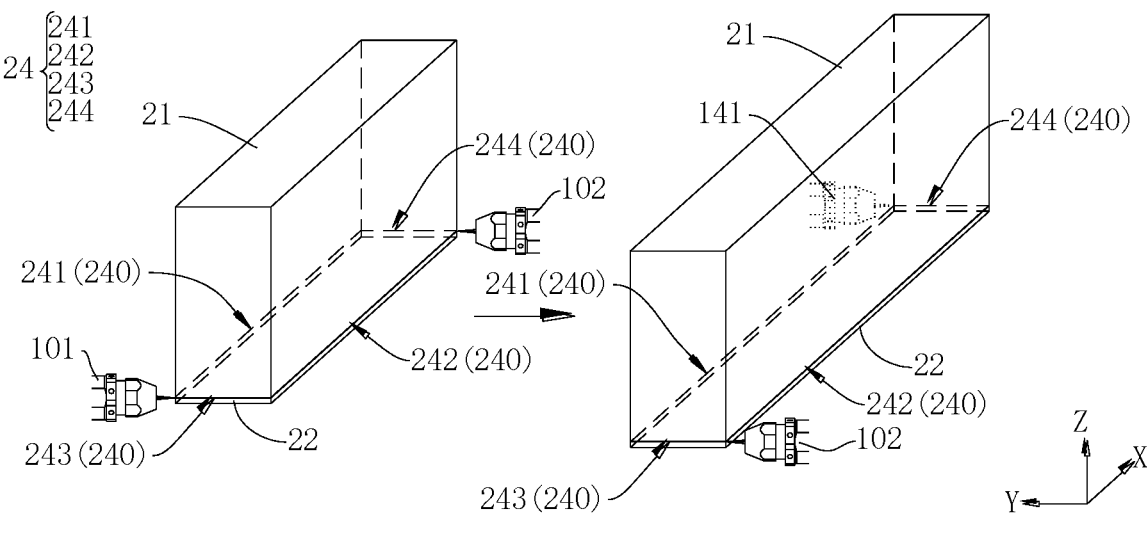
FIG. 7 is a flowchart of welding at a first welding station shown in FIG. 5.

The target weld zone 24 between the end cap 22 and the housing 21 means a connection region between the end cap 22 and the housing 21. For example, as shown in FIG. 3 and FIG. 5, the target weld zone 24 means a region formed jointly by the perimeter of the end cap 22 and the perimeter of the opening of the housing 21 and ready to be welded. The first target weld zone section 241 means a section of the target weld zone 24, the section being located on one side of the end cap 22. The second target weld zone section 242 means a section of the target weld zone 24, the section being located on the other side of the end cap 22. The first target weld zone section 241 and the second target weld zone section 242 are located on two opposite sides of the end cap 22. The first target weld zone section 241 may mean a region located at an edge on one side of the end cap 22 and ready to be welded. Similarly, the second target weld zone section 242 may mean a region located at an edge on the other side of the end cap 22 and ready to be welded. For example, as shown in FIG. 7, the first target weld zone section 241 means a section located at a rear long edge of the end cap 22 and ready to be welded; and the second target weld zone section 242 means a section located at a front long edge of the end cap 22 and ready to be welded.

Figure 15:
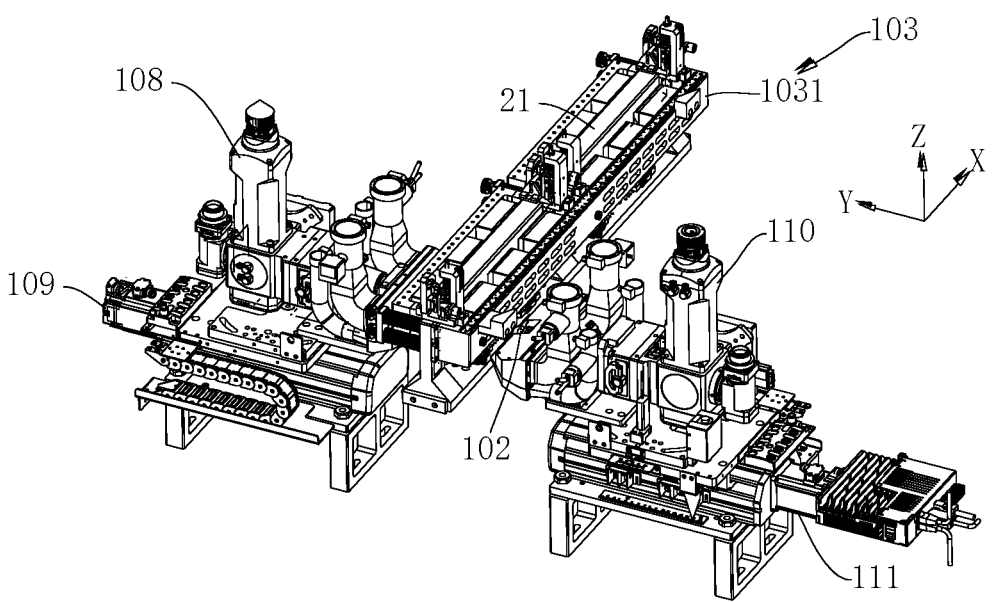
FIG. 15 is a schematic structural diagram of a welding apparatus from a viewing angle according to an embodiment of this application.
Figure 16:
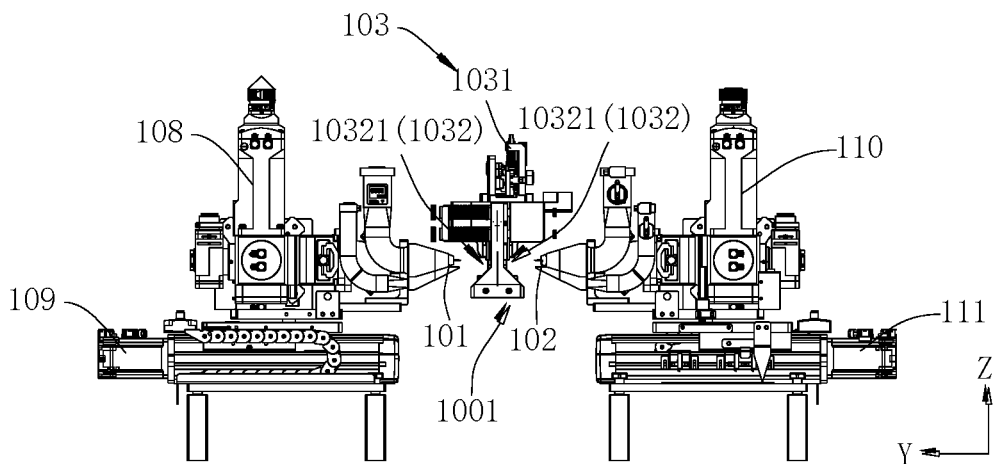
FIG. 16 is a schematic structural diagram of the welding apparatus shown in FIG. 15 from another viewing angle.
Figure 21:
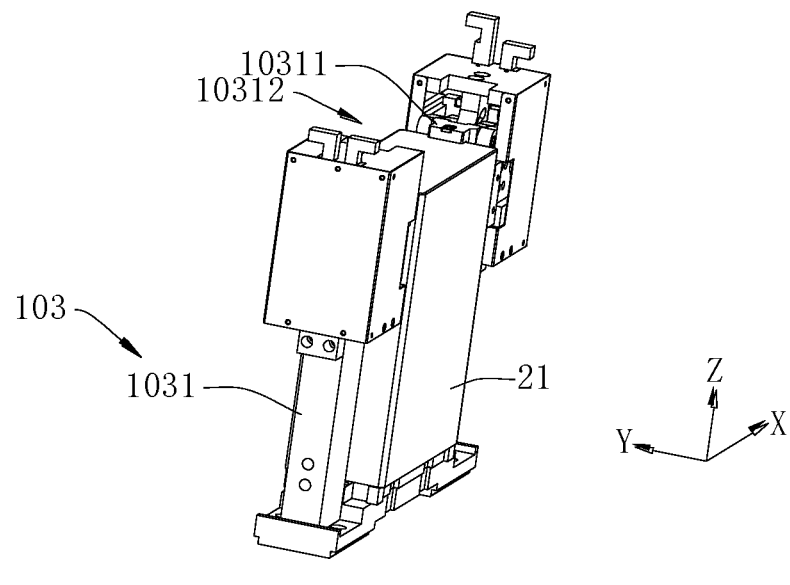
FIG. 21 is a schematic structural diagram of a first sub-jig shown in FIG. 17 from a viewing angle.
Figure 22:
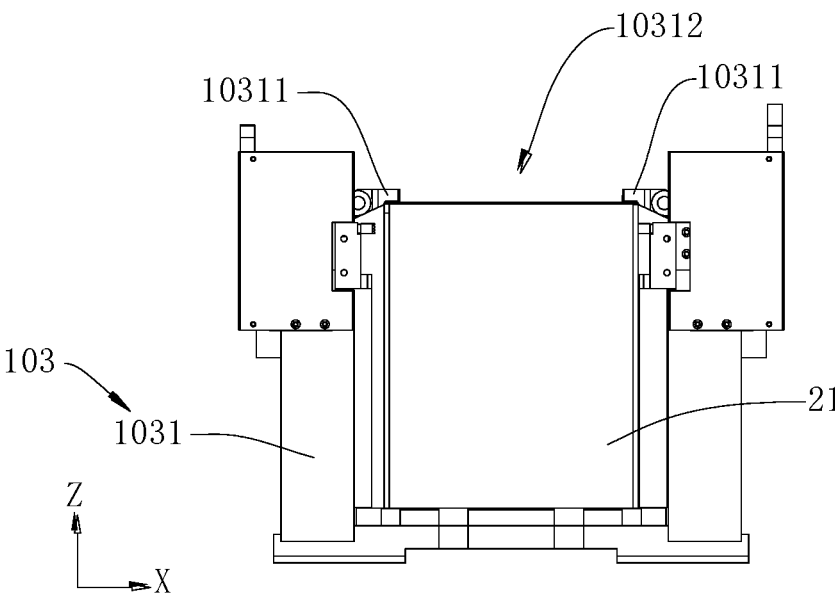
FIG. 22 is a schematic structural diagram of a first sub-jig shown in FIG. 17 from another viewing angle.
Figure 23:
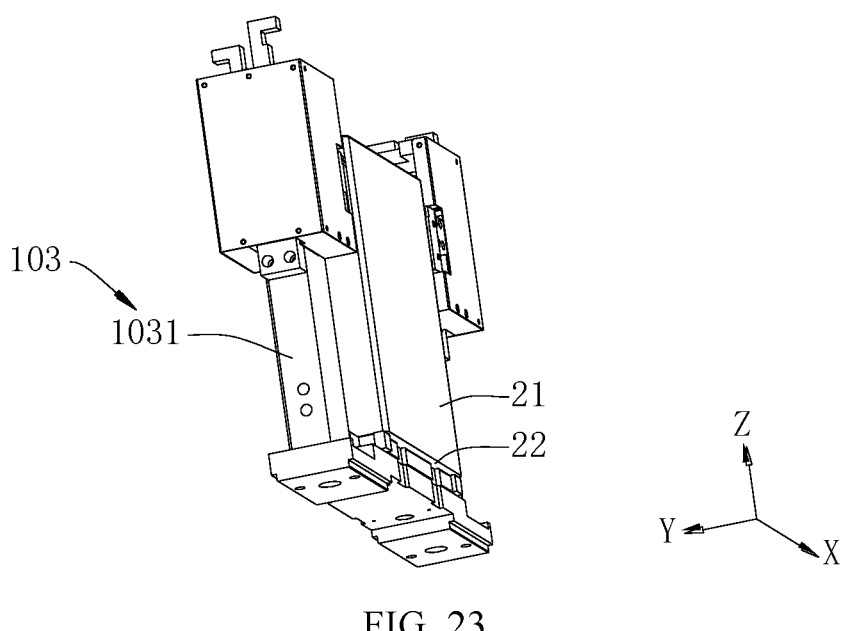
FIG. 23 is a schematic structural diagram of a first sub-jig shown in FIG. 17 from still another viewing angle.

The clearance structure means a structure available for exposing the target weld zone 24. For example, as shown in FIG. 15 and FIG. 16, the clearance structure is a through-hole created on both sides of the jig 103. For another example, as shown in FIG. 21 to FIG. 23, the clearance structure is an opening located on the front side and the rear side of the receptacle 10312. Alternatively, in other examples, the clearance structure may be other structures. The specific form of the clearance structure is not limited herein.

Understandably, moving the jig 103 to the first welding station 2201 of the welding device 200 may be, but is not limited to, moving the jig 103 to the first welding station 2201 either manually or by a conveyance apparatus 210. The first welding station 2201 is a position located between the first welding head 101 and the second welding head 102, and the jig 103 can be moved to this position. For example, as shown in FIG. 5 and FIG. 7, when the jig 103 is located at the first welding station 2201, the first welding head 101 and the first target weld zone section 241 are located on one same side of the jig 103, and the second welding head 102 and the second target weld zone section 24 are located on the same other side of the jig 103.

The first welding head 101 of the welding device 200 welds the first target weld zone section 241 through the clearance structure. The second welding head 102 of the welding device 200 welds the second target weld zone section 242 through the clearance structure. For example, the first welding head 101 and the second welding head 102 may be moved relative to the jig 103, so that the first welding head 101 welds the first target weld zone section 241 through the clearance structure and the second welding head 102 welds the second target weld zone section 242 through the clearance structure.

The first welding head 101 and the second welding head 102 are moved relative to the jig 103. Understandably, the first welding head 101 is movable relative to the jig 103, and the second welding head 102 is also movable relative to the jig 103.

When the first welding head 101 moves relative to the jig 103, the welding position of the first welding head 101 in the first target weld zone section 241 changes, thereby welding the entire section of the first target weld zone section 241 together. For example, as shown in FIG. 5 and FIG. 7, the first welding head 101 moves, relative to the jig 103, from left to right along the rear long edge of the end cap 22, thereby welding the rear long edge of the end cap 22 and the rear long edge of the opening of the housing 21 together, and in turn, completing the welding of the first target weld zone section 241.

The first welding head 101 being movable relative to the jig 103 may mean that the first welding head 101 moves and the jig 103 is fixed; or that the first welding head 101 is fixed and the jig 103 moves; or that the first welding head 101 and the jig 103 move simultaneously but at different speeds so that the first welding head 101 is able to move relative to the jig 103.

When the second welding head 102 moves relative to the jig 103, the welding position of the second welding head 102 in the second target weld zone section 242 changes, thereby welding the entire section of the second target weld zone section 242 together. For example, as shown in FIG. 5 and FIG. 7, the second welding head 102 moves, relative to the jig 103, from right to left along the front long edge of the end cap 22, thereby welding the front long edge of the end cap 22 and the front long edge of the opening of the housing 21 together, and in turn, completing the welding of the second target weld zone section 242.

The second welding head 102 being movable relative to the jig 103 may mean that the second welding head 102 moves and the jig 103 is fixed; or that the second welding head 102 is fixed and the jig 103 moves; or that the second welding head 102 and the jig 103 move simultaneously but at different speeds so that the second welding head 102 is able to move relative to the jig 103.

In the welding method according to this embodiment of this application, the housing 21 covered with an end cap 22 is mounted into the jig 103 first, and then the jig 103 and the housing 21 are moved to the first welding station 2201. At the same time, the first welding head 101 and the second welding head 102 are positioned on two opposite sides of the jig 103. Subsequently, the first welding head 101 and the second welding head 102 weld the first target weld zone section 241 and the second target weld zone section 242 respectively through the clearance structure. In this way, the two opposite sides of the end cap 22 are welded. This welding method is more efficient than the method of welding around the end cap.

In the welding method according to another embodiment of this application, as shown in FIG. 5 to FIG. 9, the target weld zone 24 includes a plurality of target weld zone sections 240. One welding head 1002 is disposed corresponding to each target weld zone section 240. The plurality of target weld zone sections 240 are connected in tandem and come together on all sides to form a ring structure. Two of the plurality of target weld zone sections 240 are the first target weld zone section 241 and the second target weld zone section 242 respectively. The welding head 1002 corresponding to the first target weld zone section 241 is the first welding head 101. The welding head 1002 corresponding to the second target weld zone section 242 is the second welding head 102.

The welding head 1002 means an actuating component for implementing welding in the welding device 200. For example, as shown in FIG. 5, the welding head 1002 may be a laser welding head. Alternatively, in other embodiments, the welding head 1002 may be an electric welding head or the like, and may be arranged depending on the actual welding needs, without being limited herein.

The target weld zone section 240 is a section located on one edge of the end cap 22 in the target weld zone 24.

A plurality of target weld zone sections 240 are connected in tandem and come together on all sides to form a ring structure. A welding head 1002 is disposed corresponding to each target weld zone section 240, and a plurality of target weld zone sections 240 are connected in tandem and come together on all sides to form a ring structure. In other words, the ring structure is formed at the perimeter of the end cap 22 and the perimeter of the opening of the housing 21. The ring structure is divided into a plurality of target weld zone sections 240. The welding heads 1002 correspond to the target weld zone sections 240 one-to-one. That is, each welding head 1002 welds the corresponding target weld zone section 240 one-to-one, thereby welding the end cap 22 to the housing 21 for a complete circle, and making the end cap 22 completely seal the inner space of the housing 21. In addition, the end cap 22 and the housing 21 are welded in sections by a plurality of welding heads 1002, thereby achieving high welding efficiency.

In an actual welding process, two adjacent target weld zone sections 240 in the target weld zone 24 terminate the welding at the same position, thereby being prone to a welding problem of insufficient molten pool at the welding end point.

In the welding method according to another embodiment of this application, as shown in FIG. 5, FIG. 6, and FIG. 7, the welding directions of two welding heads 1002 corresponding to a pair of opposite target weld zone sections 240 among the plurality of target weld zone sections 240 are opposite to each other.

The welding direction of the welding head 1002 means a movement direction of the welding position when the welding head 1002 welds the target weld zone section 240, or means a movement direction of the welding head 1002 relative to the jig 103.

In the two welding heads 1002 corresponding to a pair of opposite target weld zone sections 240 among the plurality of target weld zone sections 240, one welding head 1002 may weld in a direction indicated by the hollow arrow located on the rear side in FIG. 6, that is, in a welding direction from left to right; and the other welding head 1002 may weld in a direction indicated by the hollow arrow located on the front side in FIG. 6, that is, in a welding direction from right to left.

In the welding method according to this embodiment of this application, the welding directions of the two welding heads 1002 corresponding to a pair of opposite target weld zone sections 240 are opposite to each other. In this way, in the pair of opposite target weld zone sections 240, the welding start point and the welding end point of one target weld zone section are opposite to the welding start point and the welding end point of the other target weld zone section respectively, thereby reducing the risk of terminating the welding of different target weld zone sections at the same position, and improving the welding quality.

In the welding method according to another embodiment of this application, referring to FIG. 5 to FIG. 9, in any two adjacent target weld zone sections 240 among the plurality of target weld zone sections 240, a welding start point of one target weld zone section is connected to a welding end point of the other target weld zone section.

The welding start point is a position from which the welding begins, and the welding end point is a position at which the welding ends.

In the welding method according to this embodiment of this application, in any two adjacent target weld zone sections 240 among the plurality of target weld zone sections 240, the welding start point of one target weld zone section is connected to the welding end point of the other target weld zone section, thereby avoiding coincidence of the welding end points of all target weld zone sections 240, improving the welding quality, and improving the performance of sealing between the end cap 22 and the housing 21.

The welding directions of all the welding heads 1002 can form a clockwise or counterclockwise ring shape to obtain the above structure. In such a structure, in any two adjacent target weld zone sections 240 among the plurality of target weld zone sections 240, a welding start point of one target weld zone section is connected to a welding end point of the other target weld zone section.

Figure 11:
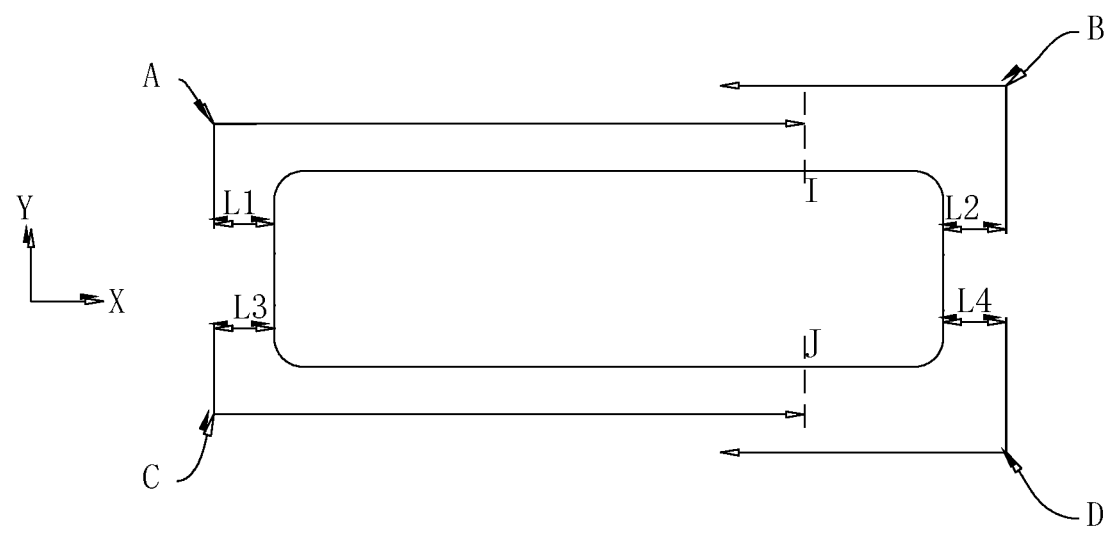
FIG. 11 is a schematic diagram of welding at a first welding station shown in FIG. 10.
Figure 12:
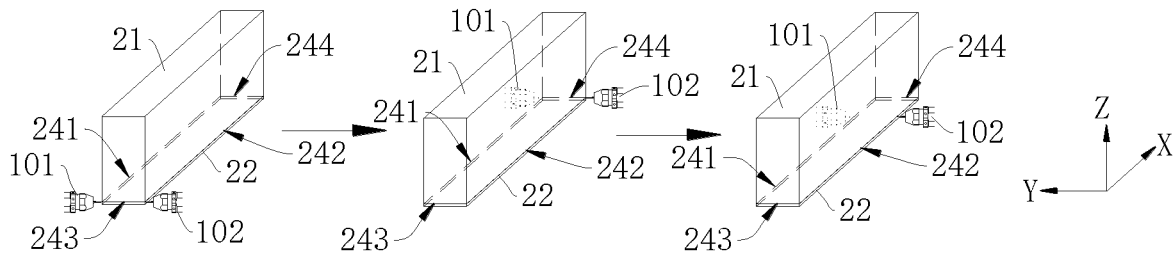
FIG. 12 is a flowchart of welding at a first welding station shown in FIG. 11.

In the welding method according to another embodiment of this application, as shown in FIG. 10 to FIG. 12, the welding directions of two welding heads 1002 corresponding to a pair of opposite target weld zone sections 240 among the plurality of target weld zone sections 240 are identical.

In the two welding heads 1002 corresponding to a pair of opposite target weld zone sections 240 among the plurality of target weld zone sections 240, one welding head may weld in a direction indicated by the hollow arrow located on the left rear side in FIG. 11, that is, in a welding direction from left to right; and the other welding head may weld in a direction indicated by the hollow arrow located on the left rear side in FIG. 11, that is, in a welding direction from left to right.

In the welding method according to this embodiment of this application, the welding directions of the two welding heads 1002 corresponding to a pair of opposite target weld zone sections 240 among the plurality of target weld zone sections 240 are identical, thereby making the welding operation simple and easy to implement.

In the welding method according to another embodiment of this application, as shown in FIG. 10 to FIG. 14, at least one welding head 1002 welds a corresponding target weld zone section 240 along a first direction and then welds the corresponding target weld zone section 240 along a reverse direction.

The first direction means a welding direction in the target weld zone section 240 corresponding to the welding head 1002. As an example, the first direction may be a direction of welding from one end of the target weld zone section 240 to the other end of the target weld zone section 240. It is hereby noted that the first direction varies with the welding head 1002, and specifically depends on the shape of the corresponding target weld zone section 240. For example, the first direction may be the direction indicated by the hollow arrow located on the left rear side in FIG. 11, that is, in a welding direction from left to right; and the reverse welding direction of the welding head may be the direction indicated by the hollow arrow located on the right rear side in FIG. 11, that is, in a welding direction from right to left.

In the welding method according to this embodiment of this application, the welding head 1002 welds the corresponding target weld zone section 240 along the first direction, and then welds the target weld zone section 240 along the reverse direction. In this way, among the two ends of the target weld zone section 240, one end is a welding start point along the first direction, and the other end is a welding start point of the reverse welding, thereby reducing the risk that the welding end points of the two adjacent target weld zone sections 240 connected together coincide at the same position, and improving the welding quality. In addition, if a welding start point is connected to a welding end point, the welding material at the welding start point will accumulate in a molten pool at the welding end point, thereby improving the welding quality.

In the welding method according to another embodiment of this application, as shown in FIG. 10 and FIG. 11, a welding stop position is created in the target weld zone section 240. The welding head 1002 stops welding at the welding stop position after welding from one end of the target weld zone section 240 to the welding stop position along the first direction, and then the welding head 1002 welds along the reverse direction to complete welding of an unwelded region on the target weld zone section 240.

The welding stop position is a position at which the welding head 1002 stops welding in a process of welding the corresponding target weld zone section 240 along the first direction, for example, as shown in FIG. 11, the position shown at I in FIG. 11.

In the welding method according to this embodiment of this application, after the welding head 1002 welds from one end of the target weld zone section 240 to the welding stop position along the first direction, and, after the welding head 1002 crosses over the other end of the target weld zone section 240, the welding head 1002 welds back to the welding stop position along a reverse direction. In this way, the welding head 1002 completes welding an unwelded region on the target weld zone section 240 along the reverse direction. This welding method makes one end of the target weld zone section 240 serve as a welding start point of welding by the welding head along the first direction, and makes the other end of the target weld zone section serve as a welding start point of welding along the reverse direction. In this way, both ends of the target weld zone section 240 serve as welding start points, thereby reducing the risk that the welding end points of the two adjacent target weld zone sections 240 connected together coincide at the same position, and improving the welding quality.

In this welding process, the welding head 1002 stops welding in advance without completing welding the target weld zone section 240. In this way, the welding head 1002 can decelerate in advance to get ready for the reverse movement of the welding head 1002, and a reverse welding command may be sent to the welding head 1002 in advance, thereby improving the welding efficiency.

In the welding method according to another embodiment of this application, as shown in FIG. 10 and FIG. 11, the welding head 1002 continues to weld along a reversed direction after moving to the welding stop position during welding along the reverse direction.

In the welding method according to this embodiment of this application, the welding head 1002 continues to weld along a reversed direction after moving to the welding stop position during welding along the reverse direction. In this way, the welding is performed twice near the welding stop position to form two weld seams. The two weld seams are stacked near the welding stop position, thereby improving the welding quality of the two weld seams at the junction, and improving the overall welding quality of the target weld zone section 240.

In the welding method according to another embodiment of this application, the target weld zone 24 further includes a third target weld zone section 243 and a fourth target weld zone section 244. The third target weld zone section 243 and the fourth target weld zone section 244 are located on two other opposite sides of the end cap 22. The first target weld zone section 241 includes a first end and a second end opposite to each other. The second target weld zone section 242 includes a third end and a fourth end opposite to each other. The third target weld zone section 243 is connected between the first end and the third end. The fourth target weld zone section 244 is connected between the second end and the fourth end.

The welding device 200 further includes a third welding head 231 and a fourth welding head 232. A second welding station 2204 is formed between the third welding head 231 and the fourth welding head 232.

The welding method further includes: moving the jig 103 to the second welding station 2204; welding, by the third welding head 231, the third target weld zone section 243 through the clearance structure; and welding, by the fourth welding head 232, the fourth target weld zone section 244 through the clearance structure.

The first end is one of the two ends opposite to each other in the first target weld zone section 241, and is a junction between the first target weld zone section 241 and the third target weld zone section 243. For example, as shown in FIG. 6 and FIG. 7, the first end is located at a corner on the left rear side of the end cap 22. The corner on the left rear side of the end cap 22 is in an arc shape. In this way, both the first welding head 101 and the third welding head 231 weld the first end.

The second end is the other of the two ends opposite to each other in the first target weld zone section 241, and is a junction between the first target weld zone section 241 and the fourth target weld zone section 244. For example, as shown in FIG. 6 and FIG. 7, the second end is located at a corner on the right rear side of the end cap 22. The corner on the right rear side of the end cap 22 is in an arc shape. In this way, both the first welding head 101 and the fourth welding head 232 weld the second end.

The third end is one of the two ends opposite to each other in the second target weld zone section 242, and is a junction between the second target weld zone section 242 and the third target weld zone section 243. For example, as shown in FIG. 6 and FIG. 7, the third end is located at a corner on the left front side of the end cap 22. The corner on the left front side of the end cap 22 is in an arc shape. In this way, both the third welding head 231 and the second welding head 102 weld the third end.

The fourth end is the other of the two ends opposite to each other in the second target weld zone section 242, and is a junction between the second target weld zone section 242 and the fourth target weld zone section 244. For example, as shown in FIG. 6 and FIG. 7, the fourth end is located at a corner on the right front side of the end cap 22. The corner on the right front side of the end cap 22 is in an arc shape. In this way, both the fourth welding head 232 and the second welding head 102 weld the fourth end.

The third target weld zone section 243 means, in the target weld zone 24, a section located on one side of the first target weld zone section 241 and connected between the first end and the third end. The fourth target weld zone section 244 means, in the target weld zone 24, a section located on the other side of the first target weld zone section 241 and connected between the second end and the fourth end. The first target weld zone section 241, the second target weld zone section 242, the third target weld zone section 243, and the fourth target weld zone section 244 are connected in tandem to form an ring structure, and disposed peripherally around the end cap 22. The third target weld zone section

243 and the fourth target weld zone section 244 each may mean a region located on one edge of the end cap 22 and ready to be welded, and are specifically determined depending on the shape of the end cap 22, without being limited herein. For example, as shown in FIG. 7, the third target weld zone section 243 means a section located at the left long edge of the end cap 22 and ready to be welded. The fourth target weld zone section 244 means a section located at the right long edge of the end cap 22 and ready to be welded.

The third welding head 231 means an actuating component for implementing welding in the welding device 200. The fourth welding head 232 means another actuating component for implementing welding in the welding device 200. For example, as shown in FIG. 5, the third welding head 231 and the fourth welding head 232 may be laser welding heads. Alternatively, in other embodiments, the third welding head 231 and the fourth welding head 232 may be electric welding heads or the like, and may be arranged depending on the actual welding needs, without being limited herein.

Understandably, moving the jig 103 into the second welding station 2204 may be, but is not limited to, moving the jig 103 into the second welding station 2204 either manually or by a conveyance apparatus 210. The second welding station 2204 is a position located between the third welding head 231 and the fourth welding head 232, and the jig 103 can be moved into this position. For example, as shown in FIG. 5 and FIG. 9, when the jig 103 is located at the second welding station 2204, the third welding head 231 and the third target weld zone section 243 are located on one same side of the jig 103, and the fourth welding head 232 and the fourth target weld zone section 24 are located on the same other side of the jig 103.

The third welding head 231 welds the third target weld zone section 243 through the clearance structure. The fourth welding head 232 welds the fourth target weld zone section 244 through the clearance structure. For example, the third welding head 231 and the fourth welding head 232 are moved relative to the jig 103, so that the third welding head 231 welds the third target weld zone section 243 through the clearance structure and the fourth welding head 232 welds the fourth target weld zone section 244 through the clearance structure.

The third welding head 231 and the fourth welding head 232 are moved relative to the jig 103. Understandably, the third welding head 231 is movable relative to the jig 103, and the fourth welding head 232 is also movable relative to the jig 103.

When the third welding head 231 moves relative to the jig 103, the welding position of the third welding head 231 in the third target weld zone section 243 changes, thereby welding the entire section of the third target weld zone section 243 together. For example, as shown in FIG. 5 and FIG. 9, the third welding head 231 moves, relative to the jig 103, from front to rear along the left short edge of the end cap 22, thereby welding the left short edge of the end cap 22 and the left short edge of the opening of the housing 21 together, and in turn, completing the welding of the third target weld zone section 243.

The third welding head 231 being movable relative to the jig 103 may mean that the third welding head 231 moves and the jig 103 is fixed; or that the third welding head 231 is fixed and the jig 103 moves; or that the third welding head 231 and the jig 103 move simultaneously but at different speeds so that the third welding head 231 is able to move relative to the jig 103.

When the fourth welding head 232 moves relative to the jig 103, the welding position of the fourth welding head 232 in the fourth target weld zone section 244 changes, thereby welding the entire section of the fourth target weld zone section 244 together. For example, as shown in FIG. 5 and FIG. 9, the fourth welding head 232 moves, relative to the jig 103, from rear to front along the right short edge of the end cap 22, thereby welding the left short edge of the end cap 22 and the left short edge of the opening of the housing 21 together, and in turn, completing the welding of the third target weld zone section 243.

The fourth welding head 232 being movable relative to the jig 103 may mean that the fourth welding head 232 moves and the jig 103 is fixed; or that the fourth welding head 232 is fixed and the jig 103 moves; or that the fourth welding head 232 and the jig 103 move simultaneously but at different speeds so that the fourth welding head 232 is able to move relative to the jig 103.

In the welding method according to this embodiment of this application, the jig 103 is moved to the second welding station 2204. At the same time, the third welding head 231 and the fourth welding head 232 are located on two opposite sides of the jig 103 respectively. Subsequently, the third welding head 231 and the fourth welding head 232 are moved relative to the jig 103, and the third welding head 231 and the fourth welding head 232 are actuated, so that the third welding head 231 and the fourth welding head 232 weld the third target weld zone section 243 and the fourth target weld zone section 244 respectively through the clearance structure, thereby welding the end cap 22 to the housing 21 on the two other opposite sides. The first welding head 101 and the second welding head 102 implement the welding of the end cap 22 and the housing 21 on the two opposite sides respectively, and the third welding head 231 and the fourth welding head 232 implement the welding of the end cap 22 and the housing 21 on the two other opposite sides respectively, thereby welding the end cap 22 to the housing 21 for a complete circle, and making the end cap 22 completely seal the inner space of the housing 21.

In this process, welding the end cap 22 to the housing 21 for a complete circle includes two steps. The first step is to weld two opposite sides of the end cap 22 and the housing 21 first, and then the second step is to weld the two other opposite sides of the end cap 22 and the housing 21. In this way, the welding is less difficult, and the welding efficiency is even higher.

For example, as shown in FIG. 7, the target weld zone section 240 may mean a section located at a rear long edge of the end cap 22 in the target weld zone 24, that is, the first target weld zone section 241; or may mean a section located at a front long edge of the end cap 22 in the target weld zone 24, that is, the second target weld zone section 242; or may mean a section located at a left short edge of the end cap 22 in the target weld zone 24, that is, the third target weld zone section 243; or may mean a section located at a right short edge of the end cap 22 in the target weld zone 24, that is, the fourth target weld zone section 244. It is hereby noted that the first welding head 101 welds the section located at the rear long edge of the end cap 22, that is, the first target weld zone section 241, and the second welding head 102 welds the section located at the front long edge of the end cap 22, that is, the second target weld zone section 242. Nevertheless, in another embodiment, the first welding head 101 welds the section located at the left short edge of the end cap 22, that is, the third target weld zone section 243, and the second welding head 102 welds the section located at the right short edge of the end cap 22, that is, the fourth target weld zone section 244.

In an actual welding process, the change in the welding speed of the welding head brings about instability of the welding energy, thereby resulting in a risk of increasing the welding defects, and impairing the welding quality.

In the welding method according to another embodiment of this application, as shown in FIG. 5, FIG. 6, and FIG. 7, the first welding head 101 includes a first endpoint and a second endpoint, and the first target weld zone section 241 is located between the first endpoint and the second endpoint; when the first welding head 101 welds the first target weld zone section 241, the first welding head 101 is actuated and starts moving from the first endpoint toward the second endpoint, starts welding the first target weld zone section 241 upon reaching a preset welding speed of the first welding head 101, welds the first target weld zone section 241 at the preset welding speed of the first welding head 101, and stops moving when the first welding head 101 moves to the second endpoint; and/or, the second welding head 102 includes a third endpoint and a fourth endpoint, and the second target weld zone section 242 is located between the third endpoint and the fourth endpoint; when the second welding head 102 welds the second target weld zone section 242, the second welding head 102 is actuated and starts moving from the third endpoint toward the fourth endpoint, starts welding the second target weld zone section 242 upon reaching a preset welding speed of the second welding head 102, welds the second target weld zone section 242 at the preset welding speed of the second welding head 102, and stops moving when the second welding head 102 moves to the fourth endpoint.

In a possible design, the first welding head 101 includes a first endpoint and a second endpoint, and the first target weld zone section 241 is located between the first endpoint and the second endpoint. When the first welding head 101 welds the first target weld zone section 241, the first welding head 101 is actuated and starts moving from the first endpoint toward the second endpoint, starts welding the first target weld zone section 241 upon reaching a preset welding speed of the first welding head 101, welds the first target weld zone section 241 at the preset welding speed of the first welding head 101, and stops moving when the first welding head 101 moves to the second endpoint. The first endpoint and the second endpoint are two opposite endpoints of a movement path of the first welding head 101 respectively. The first welding head 101 moves between the first endpoint and the second endpoint. For example, as shown in FIG. 6, the movement path of the first welding head 101 is a path indicated by the hollow arrow located at the rear side. The first endpoint is a start point of the hollow arrow located at the rear side, that is, the position indicated by the arrow A. The second endpoint is the end point of the hollow arrow located at the rear side, that is, the position indicated by the arrow B.

The first target weld zone section 241 is located between the first endpoint and the second endpoint. Understandably, the first endpoint and the second endpoint are located on two opposite lateral sides of the first target weld zone section 241. For example, as shown in FIG. 6, in the length direction (the X direction shown in FIG. 7) of the first target weld zone section 241, the spacing between the first endpoint and the left lateral side of the end cap 22 is L1, and the spacing between the second endpoint and the right lateral side of the end cap 22 is L2.

When the first welding head 101 welds the first target weld zone section 241, the first welding head 101 is actuated and starts moving from the first endpoint toward the second endpoint, starts welding the first target weld zone section 241 upon reaching a preset welding speed of the first welding head 101, welds the first target weld zone section 241 at the preset welding speed of the first welding head 101, and stops moving when the first welding head 101 moves to the second endpoint. In other words, the first welding head 101 needs to move for a distance from the first endpoint before starting to weld the first target weld zone section 241. The first welding head 101 can gradually accelerate to the preset welding speed by taking advantage of the movement for this distance, and then keep welding the first target weld zone section 241 at the preset welding speed. This reduces the risk of welding defects caused by the acceleration of the first welding head 101, and improves the quality of welding at the end portion (that is, the corner of the end cap 22) of the first target weld zone section 241. Furthermore, after completion of welding the first target weld zone section 241, the first welding head 101 can decelerate for a distance and stop at the second endpoint. In this way, the first welding head 101 can weld at the preset welding speed all along without decelerating in the process of welding the first target weld zone section 241, and decelerate after completion of welding the first target weld zone section 241. This reduces the risk of welding defects caused by the deceleration of the first welding head 101, and improves the welding quality at the end portion (that is, the corner of the end cap 22) of the first target weld zone section 241. The preset welding speed of the first welding head 101 means the moving speed that the first welding head 101 needs to achieve during the welding of the end cap 22 to the housing 21. The preset welding speed of the first welding head 101 may be selected according to the actual welding needs, and is not limited herein.

For example, as shown in FIG. 5 and FIG. 6, the first welding head 101 is a laser welding head. After the first welding head 101 moves for a distance of L1 from the first endpoint, the first welding head 101 reaches the preset welding speed at this time, and then starts to weld the first target weld zone section 241. Upon completion of welding the first target weld zone section 241, the first welding head 101 continues moving for a distance of L2 toward the second endpoint at a decelerated speed and then stops moving. At this time, the first welding head 101 is located at the second endpoint. This welding method imparts good welding quality to the first target weld zone section 241, reduces welding defects, and improves the yield rate.

In an embodiment, the preset welding speed of the first welding head 101 is greater than or equal to 300 mm/s, and the value range of L1 and the value range of L2 are 0 to 40 mm. Such settings can substantially improve the welding efficiency of the end cap 22 and the housing 21, and enhance the production capacity. Optionally, the value range of L1 and the value range of L2 are 17 mm to 20 mm.

As an example, the preset welding speed of the first welding head 101 is 300 mm/s, L1=20 mm, and L2=20 mm, so as to achieve the production capacity of welding 22 housings 21 covered with the end cap 22 per minute and achieve high welding efficiency.

In another possible design, the second welding head 102 includes a third endpoint and a fourth endpoint. The second target weld zone section 242 is located between the third endpoint and the fourth endpoint. When the second welding head 102 welds the second target weld zone section 242, the second welding head 102 is actuated and starts moving from the third endpoint toward the fourth endpoint, starts welding the second target weld zone section 242 upon reaching a preset welding speed of the second welding head 102, welds the second target weld zone section 242 at the preset welding speed of the second welding head 102, and stops moving when the second welding head 102 moves to the fourth endpoint. The third endpoint and the fourth endpoint are two opposite endpoints of a movement path of the second welding head 102 respectively. The second welding head 102 moves between the third endpoint and the fourth endpoint. For example, as shown in FIG. 6, the movement path of the second welding head 102 is a path indicated by the hollow arrow located at the front side. The third endpoint is a start point of the hollow arrow located at the front side, that is, the position indicated by the arrow C. The fourth endpoint is the end point of the hollow arrow located at the front side, that is, the position indicated by the arrow D.

The second target weld zone section 242 is located between the third endpoint and the fourth endpoint. Understandably, the third endpoint and the fourth endpoint are located on two opposite lateral sides of the second target weld zone section 242. For example, as shown in FIG. 6, in the length direction (the X direction shown in FIG. 7) of the second target weld zone section 242, the spacing between the third endpoint and the right lateral side of the end cap 22 is L3, and the spacing between the fourth endpoint and the left lateral side of the end cap 22 is L4.

When the second welding head 102 welds the second target weld zone section 242, the second welding head 102 is actuated and starts moving from the third endpoint toward the fourth endpoint, starts welding the second target weld zone section 242 upon reaching a preset welding speed of the second welding head 102, welds the second target weld zone section 242 at the preset welding speed of the second welding head 102, and stops moving when the second welding head 102 moves to the fourth endpoint. In other words, the second welding head 102 needs to move for a distance from the third endpoint before starting to weld the second target weld zone section 242. In this case, the second welding head 102 can gradually accelerate to the preset welding speed by taking advantage of the time of movement for this distance, and reduce the risk of welding defects caused by the acceleration of the welding speed of the second welding head 102 and the instability of the welding status. Subsequently, the second welding head keeps welding the second target weld zone section 242 at the preset welding speed. This reduces the risk of welding defects caused by the acceleration of the second welding head 102, and improves the quality of welding at the end portion (that is, the corner of the end cap 22) of the second target weld zone section 242. Furthermore, after completion of welding the second target weld zone section 242, the second welding head 102 can decelerate for a distance and stop at the fourth endpoint. In this way, the second welding head 102 can weld at the preset welding speed all along without decelerating in the process of welding the second target weld zone section 242, and decelerate after completion of welding the second target weld zone section 242. This reduces the risk of welding defects caused by the deceleration of the second welding head 102, and improves the welding quality at the end portion (that is, the corner of the end cap 22) of the second target weld zone section 242. The preset welding speed of the second welding head 102 means the moving speed that the second welding head needs to achieve during the welding of the end cap 22 to the housing 21. The preset welding speed of the second welding head 102 may be selected according to the actual welding needs, and is not limited herein.

For example, as shown in FIG. 5 and FIG. 6, the second welding head 102 is a laser welding head. After the second welding head 102 moves for a distance of L3 from the third endpoint, the second welding head 102 reaches the preset welding speed at this time, and then starts to weld the second target weld zone section 242. Upon completion of welding the second target weld zone section 242, the second welding head 102 continues moving for a distance of L4 toward the fourth endpoint at a decelerated speed and then stops moving. At this time, the second welding head 102 is located at the fourth endpoint. This welding method imparts good welding quality to the second target weld zone section 242, reduces welding defects, and improves the yield rate.

In an embodiment, the preset welding speed of the second welding head 102 is greater than or equal to 300 mm/s, and the value range of L3 and the value range of L4 are 0 to 40 mm. Such settings can substantially improve the welding efficiency of the end cap 22 and the housing 21, and enhance the production capacity. Optionally, the value range of L3 and the value range of L4 are 17 mm to 20 mm.

As an example, the preset welding speed of the second welding head 102 is 300 mm/s, L3=20 mm, and L4=20 mm, so as to achieve the production capacity of welding 22 housings 21 covered with the end cap 22 per minute and achieve high welding efficiency.

In another possible design, the first welding head 101 includes a first endpoint and a second endpoint, and the first target weld zone section 241 is located between the first endpoint and the second endpoint; when the first welding head 101 welds the first target weld zone section 241, the first welding head 101 is actuated and starts moving from the first endpoint toward the second endpoint, starts welding the first target weld zone section 241 upon reaching a preset welding speed of the first welding head 101, welds the first target weld zone section 241 at the preset welding speed of the first welding head 101, and stops moving when the first welding head 101 moves to the second endpoint; and/or, the second welding head 102 includes a third endpoint and a fourth endpoint, and the second target weld zone section 242 is located between the third endpoint and the fourth endpoint; when the second welding head 102 welds the second target weld zone section 242, the second welding head 102 is actuated and starts moving from the third endpoint toward the fourth endpoint, starts welding the second target weld zone section 242 upon reaching a preset welding speed of the second welding head 102, welds the second target weld zone section 242 at the preset welding speed of the second welding head 102, and stops moving when the second welding head 102 moves to the fourth endpoint. As can be seen from the above analysis, the first target weld zone section 241 and the second target weld zone section 242 can be well welded with good welding quality, thereby improving the yield rate and reducing the production cost.

In the welding method according to another embodiment of this application, as shown in FIG. 5, FIG. 8, and FIG. 9, the third welding head 231 includes a fifth endpoint and a sixth endpoint, and the third target weld zone section 243 is located between the fifth endpoint and the sixth endpoint; when the third welding head 231 welds the third target weld zone section 243, the third welding head 231 is actuated and starts moving from the fifth endpoint toward the sixth endpoint, starts welding the third target weld zone section 243 upon reaching a preset welding speed of the third welding head 231, welds the third target weld zone section

243 at the preset welding speed of the third welding head 231, and stops moving when the third welding head 231 moves to the sixth endpoint; and/or, the fourth welding head 232 includes a seventh endpoint and an eighth endpoint, and the fourth target weld zone section 244 is located between the seventh endpoint and the eighth endpoint; when the fourth welding head 232 welds the fourth target weld zone section 244, the fourth welding head 232 is actuated and starts moving from the seventh endpoint toward the eighth endpoint, starts welding the fourth target weld zone section 244 upon reaching a preset welding speed of the fourth welding head 232, welds the fourth target weld zone section 244 at the preset welding speed of the fourth welding head 232, and stops moving when the fourth welding head 232 moves to the eighth endpoint.

In a possible design, the third welding head 231 includes a fifth endpoint and a sixth endpoint, and the third target weld zone section 243 is located between the fifth endpoint and the sixth endpoint. When the third welding head 231 welds the third target weld zone section 243, the third welding head 231 is actuated and starts moving from the fifth endpoint toward the sixth endpoint, starts welding the third target weld zone section 243 upon reaching a preset welding speed of the third welding head 231, welds the third target weld zone section 243 at the preset welding speed of the third welding head 231, and stops moving when the third welding head 231 moves to the sixth endpoint. The fifth endpoint and the sixth endpoint are two opposite endpoints of a movement path of the third welding head 231 respectively. The third welding head 231 moves between the fifth endpoint and the sixth endpoint. For example, as shown in FIG. 8, the movement path of the third welding head 231 is a path indicated by the hollow arrow located at the left side. The fifth endpoint is a start point of the hollow arrow located at the left side, that is, the position indicated by the arrow E. The sixth endpoint is the end point of the hollow arrow located at the left side, that is, the position indicated by the arrow F.

The third target weld zone section 243 is located between the fifth endpoint and the sixth endpoint. Understandably, the fifth endpoint and the sixth endpoint are located on two opposite lateral sides of the third target weld zone section 243. For example, as shown in FIG. 8, in the length direction (the Y direction shown in FIG. 8) of the third target weld zone section 243, the spacing between the fifth endpoint and the front lateral side of the end cap 22 is L5, and the spacing between the sixth endpoint and the rear lateral side of the end cap 22 is L6.

When the third welding head 231 welds the third target weld zone section 243, the third welding head 231 is actuated and starts moving from the fifth endpoint toward the sixth endpoint, starts welding the third target weld zone section 243 upon reaching a preset welding speed of the third welding head 231, welds the third target weld zone section 243 at the preset welding speed of the third welding head 231, and stops moving when the third welding head 231 moves to the sixth endpoint. In other words, the third welding head 231 needs to move for a distance from the fifth endpoint before starting to weld the third target weld zone section 243. The third welding head 231 can gradually reach the preset welding speed by taking advantage of the movement for this distance, and then keep welding the third target weld zone section 243 at the preset welding speed. This reduces the risk of welding defects caused by the acceleration of the third welding head 231, and improves the quality of welding at the end portion (that is, the corner of the end cap 22) of the third target weld zone section 243. Furthermore, after completion of welding the third target weld zone section 243, the third welding head 231 can decelerate for a distance and stop at the sixth endpoint. In this way, the third welding head 231 can weld at the preset welding speed all along without decelerating in the process of welding the third target weld zone section 243, and decelerate after completion of welding the third target weld zone section 243. This reduces the risk of welding defects caused by the deceleration of the third welding head 231, and improves the welding quality of the third target weld zone section 243. The preset welding speed of the third welding head 231 means the moving speed that the third welding head 231 needs to achieve during the welding of the end cap 22 to the housing 21. The preset welding speed of the third welding head 231 may be selected according to the actual welding needs, and is not limited herein.

For example, as shown in FIG. 5 and FIG. 8, the third welding head 231 is a laser welding head. After the third welding head 231 moves for a distance of L5 from the fifth endpoint, the third welding head 231 reaches the preset welding speed at this time, and then starts to weld the third target weld zone section 243. Upon completion of welding the third target weld zone section 243, the third welding head 231 continues moving for a distance of L6 toward the sixth endpoint at a decelerated speed and then stops moving. At this time, the third welding head 231 is located at the sixth endpoint. This welding method imparts good welding quality to the third target weld zone section 243, reduces welding defects, and improves the yield rate.

In an embodiment, the preset welding speed of the third welding head 231 is greater than or equal to 300 mm/s, and the value range of L5 and the value range of L6 are 0 to 40 mm. Such settings can substantially improve the welding efficiency of the end cap 22 and the housing 21, and enhance the production capacity. Optionally, the value range of L5 and the value range of L6 are 17 mm to 20 mm.

As an example, the preset welding speed of the third welding head 231 is 300 mm/s, L5=20 mm, and L6=20 mm, so as to achieve the production capacity of welding 22 housings 21 covered with the end cap 22 per minute and achieve high welding efficiency.

In another possible design, the fourth welding head 232 includes a seventh endpoint and a eighth endpoint. The fourth target weld zone section 244 is located between the seventh endpoint and the eighth endpoint. When the fourth welding head 232 welds the fourth target weld zone section 244, the fourth welding head 232 is actuated and starts moving from the seventh endpoint toward the eighth endpoint, starts welding the fourth target weld zone section 244 upon reaching a preset welding speed of the fourth welding head 232, welds the fourth target weld zone section 244 at the preset welding speed of the fourth welding head 232, and stops moving when the fourth welding head 232 moves to the eighth endpoint. The seventh endpoint and the eighth endpoint are two opposite endpoints of a movement path of the fourth welding head 232 respectively. The fourth welding head 232 moves between the seventh endpoint and the eighth endpoint. For example, as shown in FIG. 8, the movement path of the fourth welding head 232 is a path indicated by the hollow arrow located at the right side. The seventh endpoint is a start point of the hollow arrow located at the right side, that is, the position indicated by the arrow G. The eighth endpoint is the end point of the hollow arrow located at the right side, that is, the position indicated by the arrow H.

The fourth target weld zone section 244 is located between the seventh endpoint and the eighth endpoint.

Understandably, the seventh endpoint and the eighth endpoint are located on two opposite lateral sides of the fourth target weld zone section 244. For example, as shown in FIG. 8, in the length direction (the Y direction shown in FIG. 8) of the fourth target weld zone section 244, the spacing between the seventh endpoint and the rear lateral side of the end cap 22 is L7, and the spacing between the eighth endpoint and the front lateral side of the end cap 22 is L8.

When the fourth welding head 232 welds the fourth target weld zone section 244, the fourth welding head 232 is actuated and starts moving from the seventh endpoint toward the eighth endpoint, starts welding the fourth target weld zone section 244 upon reaching a preset welding speed of the fourth welding head 232, welds the fourth target weld zone section 244 at the preset welding speed of the fourth welding head 232, and stops moving when the fourth welding head 232 moves to the eighth endpoint. In other words, the fourth welding head 232 needs to move for a distance from the seventh endpoint before starting to weld the fourth target weld zone section 244. The fourth welding head 232 can gradually accelerate to the preset welding speed by taking advantage of the movement for this distance, and then keep welding the fourth target weld zone section 244 at the preset welding speed. This reduces the risk of welding defects caused by the acceleration of the fourth welding head 232, and improves the quality of welding at the end portion (that is, the corner of the end cap 22) of the fourth target weld zone section 244. Furthermore, after completion of welding the fourth target weld zone section 244, the fourth welding head 232 can decelerate for a distance and stop at the eighth endpoint. In this way, the fourth welding head 232 can weld at the preset welding speed all along without decelerating in the process of welding the fourth target weld zone section 244, and decelerate after completion of welding the fourth target weld zone section 244. This reduces the risk of welding defects caused by the deceleration of the fourth welding head 232, and improves the welding quality at the end portion (that is, the corner of the end cap 22) of the fourth target weld zone section 244. The preset welding speed of the fourth welding head 232 means the moving speed that the fourth welding head 232 needs to achieve during the welding of the end cap 22 to the housing 21. The preset welding speed of the fourth welding head 232 may be selected according to the actual welding needs, and is not limited herein.

For example, as shown in FIG. 5 and FIG. 8, the fourth welding head 232 is a laser welding head. After the fourth welding head 232 moves for a distance of L7 from the fifth endpoint, the fourth welding head 232 reaches the preset welding speed at this time, and then starts to weld the fourth target weld zone section 244. Upon completion of welding the fourth target weld zone section 244, the fourth welding head 232 continues moving for a distance of L8 toward the eighth endpoint at a decelerated speed and then stops moving. At this time, the fourth welding head 232 is located at the eighth endpoint. This welding method imparts good welding quality to the fourth target weld zone section 244, reduces welding defects, and improves the yield rate.

In an embodiment, the preset welding speed of the fourth welding head 232 is greater than or equal to 300 mm/s, and the value range of L7 and the value range of L8 are 0 to 40 mm. Such settings can substantially improve the welding efficiency of the end cap 22 and the housing 21, and enhance the production capacity. Optionally, the value range of L7 and the value range of L8 are 17 mm to 20 mm.

As an example, the preset welding speed of the fourth welding head 232 is 300 mm/s, L7=20 mm, and L8=20 mm, so as to achieve the production capacity of welding 22 housings 21 covered with the end cap 22 per minute and achieve high welding efficiency.

In another possible design, the third welding head 231 includes a fifth endpoint and a sixth endpoint, and the third target weld zone section 243 is located between the fifth endpoint and the sixth endpoint; when the third welding head 231 welds the third target weld zone section 243, the third welding head 231 is actuated and starts moving from the fifth endpoint toward the sixth endpoint, starts welding the third target weld zone section 243 upon reaching a preset welding speed of the third welding head 231, welds the third target weld zone section 243 at the preset welding speed of the third welding head 231, and stops moving when the third welding head 231 moves to the sixth endpoint; and/or, the fourth welding head 232 includes a seventh endpoint and an eighth endpoint, and the fourth target weld zone section 244 is located between the seventh endpoint and the eighth endpoint; when the fourth welding head 232 welds the fourth target weld zone section 244, the fourth welding head 232 is actuated and starts moving from the seventh endpoint toward the eighth endpoint, starts welding the fourth target weld zone section 244 upon reaching a preset welding speed of the fourth welding head 232, welds the fourth target weld zone section 244 at the preset welding speed of the fourth welding head 232, and stops moving when the fourth welding head 232 moves to the eighth endpoint. As can be seen from the above analysis, the third target weld zone section 243 and the fourth target weld zone section 244 can be well welded with good welding quality, thereby improving the yield rate and reducing the production cost.

In an actual welding process, two adjacent target weld zone sections 240 in the target weld zone 24 terminate the welding at the same position, thereby being prone to a welding problem of insufficient molten pool at the welding end point.

In the welding method according to another embodiment of this application, the movement direction of the first welding head 101 relative to the jig 103 is opposite to the movement direction of the second welding head 102 relative to the jig 103.

The movement direction of the first welding head 101 relative to the jig 103 may be, for example, a positive direction of the X-axis shown in FIG. 6. The movement direction of the second welding head 102 relative to the jig 103 may be, for example, the negative direction of the X-axis shown in FIG. 6. Definitely, in other embodiments, the movement directions may be other directions, and are not limited herein.

In the welding method according to this embodiment of this application, the movement direction of the first welding head 101 relative to the jig 103 is opposite to the movement direction of the second welding head 102 relative to the jig 103. In this way, the welding start point and the welding end point of the first target weld zone section 241 are opposite to the welding start point and the welding end point of the second target weld zone section 242 respectively, thereby reducing the risk of terminating the welding of different target weld zone sections at the same position, and improving the welding quality.

In the welding method according to another embodiment of this application, the movement direction of the third welding head 231 relative to the jig 103 is opposite to the movement direction of the fourth welding head 232 relative to the jig 103.

The movement direction of the third welding head 231 relative to the jig 103 may be, for example, a positive direction of the Y-axis shown in FIG. 8. The movement direction of the fourth welding head 232 relative to the jig 103 may be, for example, the negative direction of the Y-axis shown in FIG. 8. Definitely, in other embodiments, the movement directions may be other directions, and are not limited herein.

In the welding method according to this embodiment of this application, the movement direction of the third welding head 231 relative to the jig 103 is opposite to the movement direction of the fourth welding head 232 relative to the jig 103. In this way, the welding start point and the welding end point of the third target weld zone section 243 are opposite to the welding start point and the welding end point of the fourth target weld zone section 244 respectively, thereby reducing the risk of terminating the welding of different target weld zone sections at the same position, and improving the welding quality.

In the welding method according to another embodiment of this application, the first welding head 101 welds the first target weld zone section 241 along a distribution direction from the first end toward the second end relative to the jig 103, and the second welding head 102 welds the second target weld zone section 242 along a distribution direction from the fourth end toward the third end. The third welding head 231 welds the third target weld zone section 243 along a distribution direction from the third end toward the first end, and the fourth welding head 232 welds the fourth target weld zone section 244 along a distribution direction from the second end toward the fourth end.

When the first welding head 101 welds the first target weld zone section 241 along the distribution direction from the first end toward the second end relative to the jig 103, for example, as shown in FIG. 5, FIG. 6, and FIG. 7, the distribution direction from the first end toward the second end is the direction indicated by the hollow arrow located at the rear side in FIG. 6. That is, the first welding head 101 moves and welds from left to right.

When the second welding head 102 welds the second target weld zone section 242 along the distribution direction from the fourth end toward the third end, for example, as shown in FIG. 5, FIG. 6, and FIG. 7, the distribution direction from the fourth end toward the third end is the direction indicated by the hollow arrow located at the front side in FIG. 6. That is, the second welding head 102 moves and welds from right to left.

When the third welding head 231 welds the third target weld zone section 243 along the distribution direction from the third end toward the first end, for example, as shown in FIG. 5, FIG. 8, and FIG. 9, the distribution direction from the third end toward the first end is the direction indicated by the hollow arrow located at the left side in FIG. 8. That is, the third welding head 231 moves and welds from front to rear.

The fourth welding head 232 welds the fourth target weld zone section 244 along the distribution direction from the second end toward the fourth end. For example, as shown in FIG. 5, FIG. 8, and FIG. 9, the distribution direction from the second end toward the fourth end is the direction indicated by the hollow arrow located at the right side in FIG. 8. That is, the fourth welding head 232 moves and welds from rear to front.

In the welding method according to this embodiment of this application, during welding, the first welding head 101 performs welding from the first end to the second end, the fourth welding head 232 performs welding from the second end to the fourth end, the second welding head 102 performs welding from the fourth end to the third end, and the third welding head 231 performs welding from the third end to the fourth end. In this way, the first end, the second end, the third end, and the fourth end each are the welding start point of one welding head and the welding end point of another welding head, thereby preventing the welding process from terminating at the same position, reducing the risk of welding defects, and improving the welding quality.

With reference to FIG. 5 to FIG. 9, the movement directions of the first welding head 101, the second welding head 102, the third welding head 231, and the fourth welding head 232 may form a ring that is schematically rotated clockwise. Nevertheless, in other embodiments, the ring may be schematically rotated counterclockwise. The movement directions of the first welding head 101, the second welding head 102, the third welding head 231, and the fourth welding head 232 may be specifically set according to actual needs.

In the welding method according to another embodiment of this application, the movement direction of the first welding head 101 relative to the jig 103 is identical to the movement direction of the second welding head 102 relative to the jig 103.

The movement direction of the first welding head 101 relative to the jig 103 may be, for example, the X direction shown in FIG. 11. The movement direction of the second welding head 102 relative to the jig 103 may be, for example, the X direction shown in FIG. 11. Definitely, in other embodiments, the movement directions may be other directions, and are not limited herein.

In the welding method according to this embodiment of this application, the movement direction of the first welding head 101 relative to the jig 103 is identical to the movement direction of the second welding head 102 relative to the jig 103, so that the welding operation is simple and easy to implement.

In the welding method according to another embodiment of this application, the movement direction of the third welding head 231 relative to the jig 103 is identical to the movement direction of the fourth welding head 232 relative to the jig 103.

Figure 13:
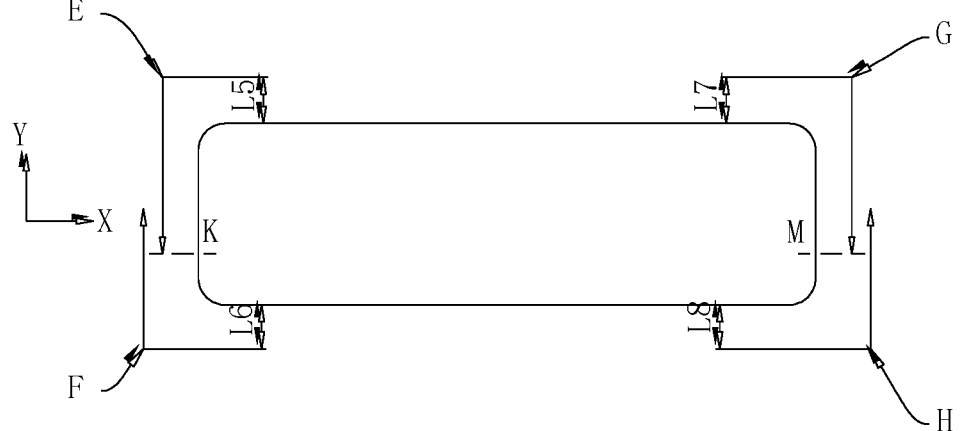
FIG. 13 is a schematic diagram of welding at a second welding station shown in FIG. 11.

The movement direction of the third welding head 231 relative to the jig 103 may be, for example, the Y direction shown in FIG. 13. The movement direction of the fourth welding head 232 relative to the jig 103 may be, for example, the Y direction shown in FIG. 13. Definitely, in other embodiments, the movement directions may be other directions, and are not limited herein.

In the welding method according to this embodiment of this application, the movement direction of the third welding head 231 relative to the jig 103 is identical to the movement direction of the fourth welding head 232 relative to the jig 103, so that the welding operation is simple and easy to implement.

In the welding method according to another embodiment of this application, as shown in FIG. 10 to FIG. 14, the first welding head 101 welds the first target weld zone section 241 along a distribution direction from the first end toward the second end, and the second welding head 102 welds the second target weld zone section 242 along a distribution direction from the third end toward the fourth end. The third welding head 231 welds the third target weld zone section 243 along a distribution direction from the first end toward the third end, and the fourth welding head 232 welds the fourth target weld zone section 244 along a distribution direction from the second end toward the fourth end.

When the first welding head 101 welds the first target weld zone section 241 along the distribution direction from the first end toward the second end, for example, as shown in FIG. 11, the distribution direction from the first end toward the second end is the direction indicated by the hollow arrow located at the left rear side in FIG. 11.

When the second welding head 102 welds the second target weld zone section 242 along the distribution direction from the third end toward the fourth end, for example, as shown in FIG. 11, the distribution direction from the third end toward the fourth end is the direction indicated by the hollow arrow located at the left front side in FIG. 11.

When the third welding head 231 welds the third target weld zone section 243 along the distribution direction from the first end toward the third end, for example, as shown in FIG. 13, the distribution direction from the first end toward the third end is the direction indicated by the hollow arrow located at the left rear side in FIG. 13.

When the fourth welding head 232 welds the fourth target weld zone section 244 along the distribution direction from the second end toward the fourth end, for example, as shown in FIG. 13, the distribution direction from the second end toward the fourth end is the direction indicated by the hollow arrow located at the right rear side in FIG. 13.

In the welding method according to this embodiment of this application, during welding, the first welding head 101 performs welding from the first end to the second end, the second welding head 102 performs welding from the third end to the fourth end, the third welding head 231 performs welding from the first end to the third end, and the fourth welding head 232 performs welding from the second end to the fourth end, thereby welding the end cap 22 to the housing 21 for a complete circle. In addition, the welding direction of the first welding head 101 is identical to the welding direction of the second welding head 102, and the welding direction of the third welding head 231 is identical to the welding direction of the fourth welding head 232, so that the welding operation is simpler and easier to implement.

However, in this welding method in practical applications, both the second welding head 102 and the fourth welding head 232 terminate the welding at the fourth end, thereby being prone to the problem of a welding defect caused by an insufficient molten pool at the fourth end.

Figure 14:
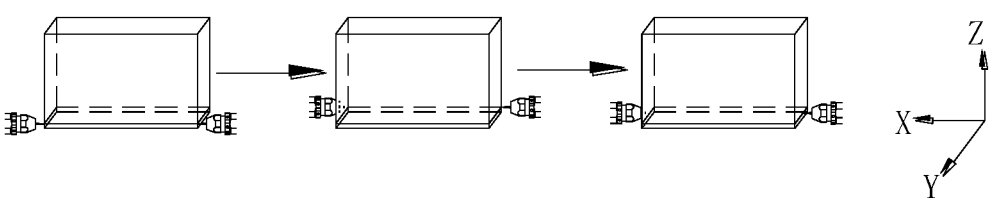
FIG. 14 is a flowchart of welding at a second welding station shown in FIG. 11.

In the welding method according to another embodiment of this application, as shown in FIG. 10, FIG. 13, and FIG. 14, after welding the second target weld zone section 242 along a distribution direction from the third end toward the fourth end, the second welding head 102 welds the second target weld zone section 242 toward the third end along a reverse direction; and/or, after welding the fourth target weld zone section 244 along a distribution direction from the second end toward the fourth end, the fourth welding head 232 welds the fourth target weld zone section 244 toward the second end along a reverse direction.

In a possible design, after welding the fourth target weld zone section 244 along a distribution direction from the second end toward the fourth end, the fourth welding head 232 welds the fourth target weld zone section 244 toward the second end along a reverse direction.

The distribution direction from the second end toward the fourth end may be the direction indicated by the hollow arrow located at the right rear side in FIG. 13. That is, the welding head moves and welds from rear to front. The welding direction of the fourth welding head 232 toward the second end along a reverse direction may be the direction indicated by the hollow arrow located at the right front side in FIG. 13. That is, the welding head moves and welds from front to rear.

When the fourth welding head 232 welds from the second end to the fourth end and then welds back toward the second end along a reverse direction, the fourth end serves as a welding start point of the fourth welding head 232 in the reverse movement. In this way, the welding material in the reverse welding accumulates at the fourth end, thereby reducing the risk of an insufficient molten pool, and improving the welding quality at the fourth end.

In the welding method according to another embodiment of this application, as shown in FIG. 10, FIG. 13, FIG. 14, a first welding stop position is created in the fourth target weld zone section 244. The first welding stop position is located between the second end and the fourth end. When the fourth welding head 232 moves to the first welding stop position during welding, the fourth welding head 232 is deactivated. When the fourth welding head 232 decelerates and crosses over the fourth end, the fourth welding head 232 is actuated again, moves toward the second end along a reverse direction, and resumes welding until the first welding stop position.

The first welding stop position is a position at which the fourth welding head 232 stops welding during welding from the second end to the fourth end. For example, as shown in FIG. 13 and FIG. 14, the fourth welding head 232 moves from the position indicated by the arrow G along the hollow arrow located at the right rear side in the drawings. The position at which the fourth welding head 232 welds when the fourth welding head 232 moves to the end point of the hollow arrow is the first welding stop position, and may be the position indicated by M in FIG. 13.

In the welding method according to this embodiment of this application, the fourth welding head 232 is deactivated when the fourth welding head 232 moves to the first welding stop position during welding. When the fourth welding head 232 decelerates and crosses over the fourth end, the fourth welding head 232 is actuated again, moves and welds toward the second end along a reverse direction until the first welding stop position. The fourth welding head 232 stops welding in advance without completing welding of the fourth target weld zone section 244. Subsequently, the fourth welding head 232 moves at a decelerated speed and crosses over the fourth end, and then moves along a reverse direction to weld the unwelded region on the fourth target weld zone section 244 by taking advantage of the decelerated movement, thereby completing the welding of the fourth target weld zone section 244. In this welding method, the fourth end serves as a welding start point of the reverse welding by the fourth welding head 232, so that the welding stop positions of the second welding head 102 and the fourth welding head 232 are prevented from coinciding at the fourth end, thereby improving the welding quality at the fourth end. Furthermore, in the welding process, the fourth welding head 232 stops welding in advance and decelerates without completing the welding of the fourth target weld zone section 244, so that the fourth welding head 232 can decelerate in advance and get ready for the reverse movement. Alternatively, a command of reverse welding may be sent to the fourth welding head 232 in advance, thereby improving the welding efficiency.

In the welding method according to another embodiment of this application, as shown in FIG. 10, FIG. 13, and FIG. 14, the fourth welding head 232 continues to move and weld toward the second end after moving to the first welding stop position during welding along the reverse direction.

In the welding method according to this embodiment of this application, the fourth welding head 232 continues to move and weld toward the second end after moving to the first welding stop position during welding along the reverse direction. In this way, the welding is performed twice near the first welding stop position to form two weld seams. The two weld seams are stacked near the first welding stop position, thereby improving the welding quality of the two weld seams at the junction, and improving the overall welding quality of the fourth target weld zone section 244.

In the welding method according to another embodiment of this application, as shown in FIG. 10, FIG. 13, and FIG. 14, the third welding head 231 moves back toward the first end along a reverse direction after moving from the first end to the third end.

The movement direction of the third welding head 231 from the first end to the third end may be the direction indicated by the hollow arrow located at the left rear side in FIG. 11. that is, moving from rear to front. The movement direction of the third welding head 231 toward the first end may be the direction indicated by the hollow arrow located at the left front side in FIG. 11, that is, moving from front to rear.

In the welding method according to this embodiment of this application, when the third welding head 231 moves from the first end to the third end and then moves and welds toward the first end along a reverse direction. In this way, the welding start point of the second welding head 102 and the reverse welding start point of the third welding head 231 meet at the third end, thereby improving the welding quality at the third end.

In the welding method according to another embodiment of this application, as shown in FIG. 10, FIG. 13, FIG. 14, a second welding stop position is created in the third target weld zone section 243. The second welding stop position is located between the first end and the third end. When the third welding head 231 moves to the second welding stop position during welding, the third welding head 231 is deactivated. When the third welding head 231 crosses over the third end, the third welding head 231 is actuated again, moves toward the first end along a reverse direction, and resumes welding until the second welding stop position.

The second welding stop position is a position at which the third welding head 231 stops welding during welding from the first end to the third end. For example, as shown in FIG. 13 and FIG. 14, the third welding head 231 moves from the position indicated by the arrow E along the hollow arrow located at the left rear side in the drawings. The position at which the third welding head 231 welds when the third welding head 231 moves to the end point of the hollow arrow is the second welding stop position, and may be the position indicated by K in FIG. 13.

In the welding method according to this embodiment of this application, the third welding head 231 is deactivated when the third welding head 231 moves to the second welding stop position during welding. When the fourth welding head 232 decelerates and crosses over the third end, the third welding head 231 is actuated again, moves and welds toward the first end along a reverse direction until the second welding stop position. The third welding head 231 stops welding in advance without completing welding of the third target weld zone section 243. Subsequently, the third welding head 231 moves at a decelerated speed and crosses over the third end, and then moves along a reverse direction to weld the unwelded region on the third target weld zone section 243 by taking advantage of the decelerated movement, thereby completing the welding of the third target weld zone section 243. In this process, the third welding head 231 stops welding in advance and decelerates without completing the welding of the third target weld zone section 243, so that the third welding head 231 can decelerate in advance and get ready for the reverse movement. Alternatively, a command of reverse welding may be sent to the third welding head 231 in advance, thereby improving the welding efficiency.

In the welding method according to another embodiment of this application, as shown in FIG. 10, FIG. 13, and FIG. 14, the third welding head 231 continues to move and weld toward the first end after moving to the second welding stop position during welding along the reverse direction.

In the welding method according to this embodiment of this application, the third welding head 231 continues to move and weld toward the first end after moving to the second welding stop position during welding along the reverse direction. In this way, the welding is performed twice near the second welding stop position to form two weld seams. The two weld seams are stacked near the second welding stop position, thereby improving the welding quality of the two weld seams at the junction, and improving the overall welding quality of the third target weld zone section 243.

In another possible design, as shown in FIG. 10, FIG. 11, and FIG. 12, after welding the second target weld zone section 242 along a distribution direction from the third end toward the fourth end, the second welding head 102 welds the second target weld zone section 242 toward the fourth end along a reverse direction.

The distribution direction from the third end toward the fourth end may be the direction indicated by the hollow arrow located at the left front side in FIG. 11. That is, the welding head moves and welds from left to right. The welding direction of the second welding head 102 toward the third end may be the direction indicated by the hollow arrow located at the right front side in FIG. 11. That is, the welding head moves and welds from right to left.

When the second welding head 102 welds from the third end to the fourth end and then welds back toward the third end along a reverse direction, the fourth end serves as a welding start point of the second welding head 102 in the reverse movement. In this way, the welding material in the reverse welding accumulates at the fourth end, thereby reducing the risk of an insufficient molten pool, and improving the welding quality at the fourth end.

In the welding method according to another embodiment of this application, as shown in FIG. 10, FIG. 11, FIG. 12, a third welding stop position is created in the second target weld zone section 242. The third welding stop position is located between the third end and the fourth end. When the second welding head 102 moves to the third welding stop position during welding, the second welding head 102 is deactivated. When the second welding head 102 crosses over the fourth end, the second welding head 102 is actuated again, moves toward the third end along a reverse direction, and resumes welding until the third welding stop position.

The third welding stop position is a position at which the second welding head 102 stops welding during welding from the third end to the fourth end. For example, as shown in FIG. 11 and FIG. 12, the second welding head 102 moves from the position indicated by the arrow C along the hollow arrow located at the left front side in the drawings. The position at which the second welding head 102 welds when the second welding head 102 moves to the end point of the hollow arrow is the third welding stop position, and may be the position indicated by J in FIG. 11.

In the welding method according to this embodiment of this application, the second welding head 102 is deactivated when the second welding head 102 moves to the third welding stop position during welding. When the second welding head 102 decelerates and crosses over the fourth end, the fourth welding head 232 is actuated again, moves and welds toward the third end along a reverse direction until the third welding stop position. The second welding head 102 stops welding in advance without completing welding of the second target weld zone section 242. Subsequently, the second welding head 102 moves at a decelerated speed and crosses over the fourth end, and then moves along a reverse direction to weld the unwelded region on the second target weld zone section 242 by taking advantage of the decelerated movement, thereby completing the welding of the second target weld zone section 242. In this welding method, the fourth end serves as a welding start point of the reverse welding by the second welding head 102, so that the welding stop positions of the second welding head 102 and the fourth welding head 232 are prevented from coinciding at the fourth end, thereby improving the welding quality at the fourth end. Furthermore, in the welding process, the second welding head 102 stops welding in advance and decelerates without completing the welding of the second target weld zone section 242, so that the second welding head 102 can decelerate in advance and get ready for the reverse movement. Alternatively, a command of reverse welding may be sent to the second welding head 102 in advance, thereby improving the welding efficiency.

In the welding method according to another embodiment of this application, as shown in FIG. 10, FIG. 11, and FIG. 12, the second welding head 102 continues to move and weld toward the third end after moving to the third welding stop position during welding along the reverse direction.

In the welding method according to this embodiment of this application, the second welding head 102 continues to move and weld toward the third end after moving to the third welding stop position during welding along the reverse direction. In this way, the welding is performed twice near the third welding stop position to form two weld seams. The two weld seams are stacked near the third welding stop position, thereby improving the welding quality of the two weld seams at the junction, and improving the overall welding quality of the second target weld zone section 242.

In the welding method according to another embodiment of this application, as shown in FIG. 10, FIG. 11, and FIG. 12, the first welding head 101 moves back toward the first end along a reverse direction after moving from the first end to the second end.

The movement direction of the first welding head 101 from the first end to the second end may be the direction indicated by the hollow arrow located at the left rear side in FIG. 11. that is, moving from left to right. The movement direction of the first welding head 101 toward the first end may be the direction indicated by the hollow arrow located at the right rear side in FIG. 11, that is, moving from right to left.

In the welding method according to this embodiment of this application, when the first welding head 101 moves from the first end to the second end and then moves and welds toward the first end along a reverse direction. In this way, the welding start point of the fourth welding head 232 and the reverse welding start point of the first welding head 101 meet at the second end, thereby improving the welding quality at the second end.

In the welding method according to another embodiment of this application, as shown in FIG. 10, FIG. 11, and FIG. 12, a fourth welding stop position is created in the first target weld zone section 241. The fourth welding stop position is located between the first end and the second end. When the first welding head 101 moves to the fourth welding stop position during welding, the first welding head 101 is deactivated. When the first welding head 101 crosses over the second end, the first welding head 101 is actuated again, moves toward the first end along a reverse direction, and resumes welding until the fourth welding stop position.

The fourth welding stop position is a position at which the first welding head 101 stops welding during welding from the first end to the second end. For example, as shown in FIG. 11 and FIG. 12, the first welding head 101 moves from the position indicated by the arrow A along the hollow arrow located at the left rear side in the drawings. The position at which the first welding head 101 welds when the first welding head 101 moves to the end point of the hollow arrow is the fourth welding stop position, and may be the position indicated by I in FIG. 11.

In the welding method according to this embodiment of this application, the first welding head 101 is deactivated when the first welding head 101 moves to the fourth welding stop position during welding. When the first welding head 101 decelerates and crosses over the second end, the first welding head 101 is actuated again, moves and welds toward the first end along a reverse direction until the fourth welding stop position. The first welding head 101 stops welding in advance without completing welding of the first target weld zone section 241. Subsequently, the first welding head 101 moves at a decelerated speed and crosses over the second end, and then moves along a reverse direction to weld the unwelded region on the first target weld zone section 241 by taking advantage of the decelerated movement, thereby completing the welding of the first target weld zone section 241. In this process, the first welding head 101 stops welding in advance and decelerates without completing the welding of the first target weld zone section 241, so that the first welding head 101 can decelerate in advance and get ready for the reverse movement. Alternatively, a command of reverse welding may be sent to the first welding head 101 in advance, thereby improving the welding efficiency.

In the welding method according to another embodiment of this application, as shown in FIG. 10, FIG. 11, and FIG. 12, the first welding head 101 continues to move and weld toward the first end after moving to the fourth welding stop position during welding along the reverse direction.

In the welding method according to this embodiment of this application, the first welding head 101 continues to move and weld toward the first end after moving to the fourth welding stop position during welding along the reverse direction. In this way, the welding is performed twice near the fourth welding stop position to form two weld seams. The two weld seams are stacked near the fourth welding stop position, thereby improving the welding quality of the two weld seams at the junction, and improving the overall welding quality of the first target weld zone section 241.

In still another possible design, as shown in FIG. 10 to FIG. 14, after welding the second target weld zone section 242 along a distribution direction from the third end toward the fourth end, the second welding head 102 welds the second target weld zone section 242 toward the fourth end along a reverse direction.

After welding the fourth target weld zone section 244 along a distribution direction from the second end toward the fourth end, the fourth welding head 232 welds the fourth target weld zone section 244 toward the second end along a reverse direction.

In the welding method according to this embodiment of this application, by means of the reverse welding, the welding material accumulates at the fourth end, thereby reducing the risk of an insufficient molten pool, and improving the welding quality at the fourth end.

In the welding method according to another embodiment of this application, as shown in FIG. 5 to FIG. 9, the welding device 200 includes a transit station 2203. The jig 103 includes a first sub-jig 1031 and a second sub-jig that are configured to carry the housing 21 covered with the end cap 22. A first clearance sub-structure 10321 is created on two opposite sides of the first sub-jig 1031, and the two first clearance sub-structures 10321 are available for exposing the first target weld zone section 241 and the second target weld zone section 242 respectively. A second clearance sub-structure is created on two opposite sides of the second sub-jig, and the two second clearance sub-structures are available for exposing the third target weld zone section 243 and the fourth target weld zone section 244 respectively. Before the first target weld zone section 241 and the second target weld zone section 242 are welded, the housing 21 covered with the end cap 22 is placed in the first sub-jig 1031, and then the first sub-jig 1031 is moved into the first welding station 2201. The first welding head 101 welds the first target weld zone section 241 through the corresponding first clearance sub-structure 10321. The second welding head 102 welds the second target weld zone section 242 through the corresponding first clearance sub-structure 10321. Subsequently, the first sub-jig 1031 is moved to the transit station 2203, and then the housing 21 covered with the end cap 22 is taken out from the first sub-jig 1031, and placed into the second sub-jig, and then the second sub-jig is moved into the second welding station 2204. The third welding head 231 welds the third target weld zone section 243 through the corresponding second clearance sub-structure, and the fourth welding head 232 welds the fourth target weld zone section 244 through the corresponding second clearance sub-structure.

The first sub-jig 1031 means a jig 103 capable of holding the housing 21 covered with the end cap 22 and capable of being used in the first welding station 2201. The first clearance sub-structure 10321 is created on both opposite sides of the first sub-jig 1031. The two first clearance sub-structures 10321 are available for exposing the first target weld zone section 241 and the second target weld zone section 242 respectively. In this way, the first welding head 101 and the second welding head 102 implement the welding of the first target weld zone section 241 and the second target weld zone section 242 through the first clearance sub-structures 10321, respectively. For example, as shown in FIG. 15 and FIG. 16, the two first clearance sub-structures 10321 are through holes created on two opposite sides of the first sub-jig 1031. For another example, as shown in FIG. 21 to FIG. 23, the two first clearance sub-structures 10321 are openings created on the left side and the right side of a receptacle 10312 in the first sub-jig 1031 respectively.

The second sub-jig means a jig 103 capable of holding the housing 21 covered with the end cap 22 and capable of being used in the second welding station 2204. The second clearance sub-structure is created on both opposite sides of the second sub-jig. The two second clearance sub-structures are available for exposing the third target weld zone section 243 and the fourth target weld zone section 244 respectively. In this way, the third welding head and the fourth welding head 232 implement the welding of the third target weld zone section 243 and the fourth target weld zone section 244 through the second clearance sub-structures, respectively.

The first sub-jig 1031 and the second sub-jig may assume the same structure except that the two second clearance sub-structures on the second sub-jig are available for exposing the third target weld zone section 243 and the fourth target weld zone section 244 when the housing 21 covered with the end cap 22 is mounted in the second sub-jig. Definitely, in other embodiments, the structure of the first sub-jig 1031 may be different from that of the second sub-jig, and may be specifically selected according to the actual needs, without being limited herein.

The transit station 2203 is a position from which the housing 21 covered with the end cap 22 is moved from the first sub-jig 1031 into the second sub-jig.

When the jig 103 is used in an actual welding process, in order to completely expose the target weld zone 24 on the perimeter of the end cap 22 and the housing 21, the jig 103 needs to be severed into two parts that are completely separated from each other. At the same time, the jig 103 also needs to be able to fix the end cap 22 to the housing 21, and one jig 103 is hardly enough to achieve this purpose. In the welding method according to an embodiment of this application, the housing 21 covered with the end cap 22 is mounted in the first sub-jig 1031 first, and the first target weld zone section 241 and the second target weld zone section 242 are exposed through the corresponding first clearance sub-structures 10321. Subsequently, the first sub-jig 1031 is moved into the first welding station 2201. The first welding head 101 welds the first target weld zone section 241 through the corresponding first clearance sub-structure 10321. The second welding head 102 welds the second target weld zone section 242 through the corresponding first clearance sub-structure 10321. After completion of the welding of the first target weld zone section 241 and the second target weld zone section 242, the first sub-jig 1031 is moved to the transit station 2203, and then the housing 21 covered with the end cap 22 is moved from the first sub-jig 1031 into the second sub-jig. The third target weld zone section 243 and the fourth target weld zone section 244 are exposed through the corresponding second clearance sub-structures. Subsequently, the second sub-jig is moved into the second welding station 2204. The third welding head 231 and the fourth welding head 232 weld the third target weld zone section 243 and the fourth target weld zone section 244 through the corresponding second clearance sub-structures, respectively, thereby welding the end cap 22 to the housing 21 for a complete circle. In addition, different sections of the target weld zone 24 of the end cap 22 and the housing 21 are exposed by using the first sub-jig 1031 and the second sub-jig, thereby avoiding the need to sever the first sub-jig 1031 from the second sub-jig. The reliability of fixing the housing 21 covered with the end cap 22 in the jig 103 is high, thereby improving the welding quality, and in turn, reducing the difficulty of the welding between the end cap 22 and the housing 21, and improving the welding effect of the end cap 22 and the housing 21.

Definitely, in other embodiments, the transit station 2203 may be omitted in the welding device 200. The jig 103 is a single component, and the specific arrangement of the jig is not limited herein as long as the jig 103 allows the entire target weld zone 24 to be exposed.

In the welding method according to another embodiment of this application, as shown in FIG. 5 to FIG. 9, the welding device 200 further includes a first trimming station 2202.

After the first sub-jig 1031 is moved out of the first welding station 2201 and before the first sub-jig is moved into the transit station 2203, the first sub-jig 1031 is moved into the first trimming station 2202 to trim a first weld structure formed in the first target weld zone section 241 and a second weld structure formed in the second target weld zone section 242.

The first trimming station 2202 is a position available for trimming the first weld structure formed in the first target weld zone section 241 and the second weld structure formed in the second target weld zone section 242. Understandably, the welding device 200 includes a first trimming apparatus. The first trimming apparatus is configured to trim the first weld structure formed in the first target weld zone section 241 and the second weld structure formed in the second target weld zone section 242. The first trimming apparatus is any weld trimming apparatus that is currently commonly seen in the market, the details of which are omitted here.

In the welding method according to this embodiment of this application, after completion of welding the first target weld zone section 241 and the second target weld zone section 242, a first weld structure is formed in the first target weld zone section 241, and a second weld structure is formed in the second target weld zone section 242. Subsequently, the first sub-jig 1031 is moved into the first trimming station 2202. Afterward, the first weld structure and the second weld structure are trimmed to rub off the part protruding beyond the end cap 22 and the housing 21 on the first weld structure and the second weld structure, so as to impart a good appearance to the end cap 22 and the housing 21 and reduce the risk of damage to other components.

In the welding method according to another embodiment of this application, as shown in FIG. 5 to FIG. 9, the welding device 200 further includes a second trimming station 2205. After completion of welding the third target weld zone section 243 and the fourth target weld zone section 244, the second sub-jig is moved into the second trimming station 2205 to trim a third weld structure formed in the third target weld zone section 243 and a fourth weld structure formed in the fourth target weld zone section 244.

The second trimming station 2205 is a position available for trimming the third weld structure formed in the third target weld zone section 243 and the fourth weld structure formed in the fourth target weld zone section 244. Understandably, the welding device 200 includes a second trimming apparatus. The second trimming apparatus is configured to trim the third weld structure formed in the third target weld zone section 243 and the fourth weld structure formed in the fourth target weld zone section 244. The second trimming apparatus is any weld trimming apparatus that is currently commonly seen in the market, the details of which are omitted here.

In the welding method according to this embodiment of this application, after completion of welding the third target weld zone section 243 and the fourth target weld zone section 244, a third weld structure is formed in the third target weld zone section 243, and a fourth weld structure is formed in the fourth target weld zone section 244. Subsequently, the second sub-jig is moved into the second trimming station 2205. Afterward, the third weld structure and the fourth weld structure are trimmed to rub off the part protruding beyond the end cap 22 and the housing 21 on the third weld structure and the fourth weld structure, so as to impart a good appearance to the end cap 22 and the housing 21 and reduce the risk of damage to other components.

In the welding method according to another embodiment of this application, as shown in FIG. 5 to FIG. 9, the welding device 200 further includes a conveyance apparatus 210. The conveyance apparatus 210 can convey the first sub-jig 1031 into the first welding station 2201, the first trimming station 2202, and the transit station 2203. The conveyance apparatus 210 can also convey the second sub-jig into the transit station 2203, the second welding station 2204, and the second trimming station 2205.

In the welding method according to this embodiment of this application, the first sub-jig 1031 and the second sub-jig are conveyed by the conveyance apparatus 210, thereby mechanizing operations and improving the welding efficiency and the welding quality.

In the welding method according to another embodiment of this application, as shown in FIG. 5 to FIG. 9, before the housing 21 covered with the end cap 22 is placed into the jig 103, the end cap 22 is made to fit and cover the housing 21, and the end cap 22 is positioned under the housing 21, and then placed into the jig 103.

After the end cap 22 is made to fit and cover the housing 21 and the end cap 22 is positioned under the housing 21, understandably, as shown in FIG. 21 to FIG. 23, when the housing 21 covered with the end cap 22 is placed inside the jig 103, the housing 21 is inverted on the end cap 22. That is, the end cap 22 is located below the housing 21. On the one hand, the housing 21 can be stably and reliably inverted on the end cap 22 by virtue of the inherent gravity, thereby improving the stability of the connection between the end cap 22 and the housing 21, and improving the accuracy of subsequent welding. On the other hand, during welding, the risk of dust entering the housing 21 is also be reduced.

In an embodiment, as shown in FIG. 5, the welding device 200 includes a conveyance apparatus 210. The conveyance apparatus 210 is arranged in an inverted-L shape. An assembling station 2206, a first welding station 2201, a first trimming station 2202, and a transit station 2203 are distributed sequentially along the horizontal conveyance direction in the horizontal conveyance part of the conveyance apparatus 210. A transit station 2203, a second welding station 2204, and a second trimming station 2205 are distributed sequentially along the vertical conveyance direction in the vertical conveyance part of the conveyance apparatus 210.

First, as shown in FIG. 5, at the assembling station 2206, the housing 21 is inverted on the end cap 22, and then the housing 21 covered with the end cap 22 is placed in the first sub-jig 1031.

Afterward, as shown in FIG. 5, FIG. 6, and FIG. 7, the conveyance apparatus 210 conveys the first sub-jig 1031 into the first welding station 2201. The first welding head 101 is actuated, and moves from the position A toward the position B, that is, from left to right. When the first welding head 101 has moved for a distance of L1, that is, before the first welding head 101 starts to weld the first target weld zone section 241, after the first welding head 101 reaches a preset welding speed of the first welding head 101, the first welding head 101 continues moving and keeps welding the first target weld zone section 241 at the preset welding speed. Upon completion of welding the first target weld zone section 241, the first welding head 101 starts to decelerate and is gradually deactivated, and completely stops moving and is completely deactivated when moving to the position B. In this way, both the acceleration section and the deceleration section of the first welding head 101 are located outside the first target weld zone section 241, thereby reducing the impact caused by the unstable speeds of the acceleration and deceleration on the welding quality, and improving the welding quality.

At the same time, the second welding head 102 is actuated, and moves from the position C to the position D, that is, from right to left. When the second welding head 102 has moved for a distance of L3, that is, before the second welding head 102 starts to weld the second target weld zone section 242, after the second welding head 102 reaches a preset welding speed of the second welding head 102, the second welding head 102 continues moving and keeps welding the second target weld zone section 242 at the preset welding speed of the second welding head 102. Upon completion of welding the second target weld zone section 242, the second welding head 102 starts to decelerate and is gradually deactivated, and completely stops moving and is completely deactivated when moving to the position D. In this way, both the acceleration section and the deceleration section of the second welding head 102 are located outside the second target weld zone section 242, thereby reducing the impact caused by the unstable speeds of the acceleration and deceleration on the welding quality, and improving the welding quality.

Subsequently, as shown in FIG. 5, the conveyance apparatus 210 moves the first sub-jig 1031 into the first trimming station 2202 to trim the first weld structure formed in the first target weld zone section 241 and the second weld structure formed in the second target weld zone section 242.

Thereafter, as shown in FIG. 5, the conveyance apparatus 210 moves the first sub-jig 1031 into the transit station 2203, and then moves the housing 21 covered with the end cap 22 in the first sub-jig 1031 into the second sub-jig.

Afterward, as shown in FIG. 5, FIG. 8, and FIG. 9, the conveyance apparatus 210 conveys the second sub-jig into the second welding station 2204. The third welding head 231 is actuated, and starts to move from the position E toward the position F, that is, from front to rear. When the third welding head 231 has moved for a distance of L5, that is, before the third welding head 231 starts to weld the third target weld zone section 243, after the third welding head 231 reaches a preset welding speed of the third welding head 231, the third welding head 231 continues moving and keeps welding the third target weld zone section 243 at the preset welding speed. Upon completion of welding the third target weld zone section 243, the third welding head 231 starts to decelerate and is gradually deactivated, and completely stops moving and is completely deactivated when moving to the position F. In this way, both the acceleration section and the deceleration section of the third welding head 231 are located outside the third target weld zone section 243, thereby reducing the impact caused by the unstable speeds of the acceleration and deceleration on the welding quality, and improving the welding quality.

At the same time, the fourth welding head 232 is actuated, and moves from the position G to the position H, that is, from rear to front. When the fourth welding head 232 has moved for a distance of L7, that is, before the fourth welding head 232 starts to weld the fourth target weld zone section 244, after the fourth welding head 232 reaches a preset welding speed of the fourth welding head 232, the fourth welding head 232 continues moving and keeps welding the fourth target weld zone section 244 at the preset welding speed of the fourth welding head 232. Upon completion of welding the fourth target weld zone section 244, the fourth welding head 232 starts to decelerate and is gradually deactivated, and completely stops moving and is completely deactivated when moving to the position H. In this way, both the acceleration section and the deceleration section of the fourth welding head 232 are located outside the fourth target weld zone section 244, thereby reducing the impact caused by the unstable speeds of the acceleration and deceleration on the welding quality, and improving the welding quality.

Finally, as shown in FIG. 5, the conveyance apparatus 210 moves the second sub-jig into the second trimming station

2205 to trim the third weld structure formed in the third target weld zone section 243 and the fourth weld structure formed in the fourth target weld zone section 244.

In this welding process, the first welding head 101 welds from left to right, and the second welding head 102 welds from right to left. The third welding head 231 welds from front to rear, and the fourth welding head 232 welds from rear to front. In this way, the welding start point and the welding stop position of different welding heads are prevented from coinciding at the same position, thereby reducing the risk of welding defects and improving the welding quality.

In an embodiment, as shown in FIG. 10, the welding device 200 includes a conveyance apparatus 210. The conveyance apparatus 210 is arranged in an inverted-L shape. An assembling station 2206, a first welding station 2201, a first trimming station 2202, and a transit station 2203 are distributed sequentially along the horizontal conveyance direction in the horizontal conveyance part of the conveyance apparatus 210. A transit station 2203, a second welding station 2204, and a second trimming station 2205 are distributed sequentially along the vertical conveyance direction in the vertical conveyance part of the conveyance apparatus 210.

First, as shown in FIG. 10, at the assembling station 2206, the housing 21 is inverted on the end cap 22, and then the housing 21 covered with the end cap 22 is placed in the first sub-jig 1031.

Afterward, as shown in FIG. 10, FIG. 11, and FIG. 12, the conveyance apparatus 210 conveys the first sub-jig 1031 into the first welding station 2201. The first welding head 101 is actuated, and moves from the position A toward the position B, that is, from left to right. When the first welding head 101 has moved for a distance of L1, that is, before the first welding head 101 starts to weld the first target weld zone section 241, after the first welding head 101 reaches a preset welding speed of the first welding head 101, the first welding head 101 continues moving and keeps welding the first target weld zone section 241 at the preset welding speed. When the first welding head 101 moves to the position I during welding, the first welding head 101 is deactivated and moves at a decelerated speed. When the first welding head 101 moves to the position B, the first welding head 101 is actuated and starts to move toward the position A along a reverse direction, that is, from right to left. When the first welding head 101 has moved for a distance of L2, that is, before the first welding head 101 re-welds the first target weld zone section 241, after the first welding head 101 reaches the preset welding speed of the first welding head 101, the first welding head 101 continues moving along the reverse direction and keeps welding the first target weld zone section 241 at the preset welding speed. When the first welding head 101 moves to the position I during welding, the first welding head 101 starts to decelerate and is then deactivated after moving for a distance, thereby implementing the welding of the first target weld zone section 241. It is hereby noted that in order to clearly show the movement direction of the first welding head 101, at the rear side of FIG. 11, two hollow arrows staggered left and right are used to indicate the movement directions. In an actual welding process, the distance between the first welding head 101 and the rear lateral side of the end cap 22 may keep constant or variable depending on actual needs, without being limited herein.

At the same time, the second welding head 102 is actuated, and moves from the position C to the position D, that is, from left to right. When the second welding head 102 has moved for a distance of L3, that is, before the second welding head 102 starts to weld the second target weld zone section 242, after the second welding head 102 reaches a preset welding speed of the second welding head 102, the second welding head 102 continues moving and keeps welding the second target weld zone section 242 at the preset welding speed of the second welding head 102. When the second welding head 102 moves to the position J during welding, the second welding head 102 is deactivated and starts to decelerate. When the second welding head 102 moves to the position D, the second welding head 102 is actuated and moves toward the position C along a reverse direction, that is, from right to left. When the second welding head 102 has moved for a distance of L4, that is, before the second welding head 102 welds the second target weld zone section 242, after the second welding head 102 reaches the preset welding speed of the second welding head 102, the second welding head 102 continues moving and keeps welding the second target weld zone section 242 at the preset welding speed of the second welding head 102. When the second welding head 102 moves to the position J during welding, the second welding head 102 starts to decelerate and is then deactivated after moving for a distance, thereby implementing the welding of the second target weld zone section 242. It is hereby noted that in order to clearly show the movement direction of the first welding head 101, at the front side of FIG. 11, two hollow arrows staggered left and right are used to indicate the movement directions. In an actual welding process, the distance between the second welding head 102 and the front lateral side of the end cap 22 may keep constant or variable depending on actual needs, without being limited herein.

Subsequently, as shown in FIG. 10, the conveyance apparatus 210 moves the first sub-jig 1031 into the first trimming station 2202 to trim the first weld structure formed in the first target weld zone section 241 and the second weld structure formed in the second target weld zone section 242.

Thereafter, as shown in FIG. 10, the conveyance apparatus 210 moves the first sub-jig 1031 into the transit station 2203, and then moves the housing 21 covered with the end cap 22 in the first sub-jig 1031 into the second sub-jig.

Afterward, as shown in FIG. 10, FIG. 11, and FIG. 12, the conveyance apparatus 210 conveys the second sub-jig to the second welding station 2204. The third welding head 231 is actuated, and starts to move from the position E toward the position F, that is, from rear to front. When the third welding head 231 has moved for a distance of L5, that is, before the third welding head 231 starts to weld the third target weld zone section 243, after the third welding head 231 reaches a preset welding speed of the third welding head 231, the third welding head 231 continues moving and keeps welding the third target weld zone section 243 at the preset welding speed. When the third welding head 231 moves to the position K during welding, the third welding head 231 is deactivated and starts to decelerate. When moving to the position F, the third welding head 231 is actuated and moves toward the position E along a reverse direction, that is, from front to rear. When the third welding head 231 has moved for a distance of L6, that is, before the third welding head 231 welds the third target weld zone section 243 along the reverse direction, after the third welding head 231 reaches the preset welding speed of the third welding head 231, the third welding head 231 continues moving and keeps welding the third target weld zone section 243 at the preset welding speed. When the third welding head 231 moves to the position K during welding, the third welding head 231 starts to decelerate and is then deactivated after moving for a distance, thereby implementing the welding of the third target weld zone section 243. It is hereby noted that in order to clearly show the movement direction of the third welding head 231, at the left side of FIG. 13, two hollow arrows staggered left and right are used to indicate the movement directions. In an actual welding process, the distance between the third welding head 231 and the left lateral side of the end cap 22 may keep constant or variable depending on actual needs, without being limited herein.

At the same time, the fourth welding head 232 is actuated, and moves from the position G to the position H, that is, from rear to front. When the fourth welding head 232 has moved for a distance of L7, that is, before the fourth welding head 232 starts to weld the fourth target weld zone section 244, after the fourth welding head 232 reaches a preset welding speed of the fourth welding head 232, the fourth welding head 232 continues moving and keeps welding the fourth target weld zone section 244 at the preset welding speed of the fourth welding head 232. When the fourth welding head 232 moves to the position M during welding, the fourth welding head 232 is deactivated and starts to decelerate. When moving to the position H, the fourth welding head 232 is actuated and moves toward the position G along a reverse direction. When the fourth welding head 232 has moved for a distance of L8, that is, before the fourth welding head 232 starts to weld the fourth target weld zone section 244, after the fourth welding head 232 reaches the preset welding speed of the fourth welding head 232, the fourth welding head 232 continues moving and keeps welding the fourth target weld zone section 244 at the preset welding speed of the fourth welding head 232. When the fourth welding head 232 moves to the position M during welding, the fourth welding head 232 starts to decelerate and is then deactivated after moving for a distance, thereby implementing the welding of the fourth target weld zone section 244. It is hereby noted that in order to clearly show the movement direction of the fourth welding head 232, at the right side of FIG. 13, two hollow arrows staggered left and right are used to indicate the movement directions. In an actual welding process, the distance between the fourth welding head 232 and the left lateral side of the end cap 22 may keep constant or variable depending on actual needs, without being limited herein.

Finally, as shown in FIG. 10, the conveyance apparatus 210 moves the second sub-jig into the second trimming station 2205 to trim the third weld structure formed in the third target weld zone section 243 and the fourth weld structure formed in the fourth target weld zone section 244.

In this welding process, the movement direction of the first welding head 101 is identical to the movement direction of the second welding head 102, and the movement direction of the third welding head 231 is identical to the movement direction of the fourth welding head 232, so that the welding operation is simple and easy to implement. Furthermore, the welding start points in all the weld structures resulting from the welding intersect at the corners of the end cap 22, thereby achieving high welding quality of the end cap 22 and the housing 21 at the corners of the end cap 22, and improving the performance of sealing between the end cap 22 and the housing 21.

In another embodiment of this application, as shown in FIG. 15 and FIG. 16, a welding apparatus 100 is provided. The welding apparatus 100 includes a first welding head 101, a second welding head 102, and a jig 103. The jig 103 is configured to carry a housing 21 covered with an end cap 22. A clearance structure available for exposing the target weld zone 24 located between the end cap 22 and the housing 21 is created on the jig 103. A welding station 1001 is formed between the first welding head 101 and the second welding head 102. When the jig 103 is located in the welding station 1001, the first welding head 101 and the second welding head 102 weld the target weld zone sections 240 in the target weld zone 24 respectively through the clearance structure 1032, the target weld zone sections being located on two opposite sides of the end cap 22 respectively.

The welding station 1001 is a position located between the first welding head 101 and the second welding head 102. After the jig 103 is moved to the welding station 1001, the first welding head 101 and the second welding head 102 can weld the corresponding target weld zone sections 240. The welding station 1001 may be the first welding station 2201 mentioned earlier above, or the second welding station 2204 mentioned earlier above, depending on the position of the welding apparatus 100 in the welding device 200, without being limited herein.

The target weld zone section 240 is a section located on a lateral side of the end cap 22 in the target weld zone 24. As shown in FIG. 7, the target weld zone section 240 may mean a section located at a rear long edge of the end cap 22 in the target weld zone 24, that is, the first target weld zone section 241, or may be a section located at a front long edge of the end cap 22 in the target weld zone 24, that is, the second target weld zone section 242; or may mean a section located at a left short edge of the end cap 22 in the target weld zone 24, that is, the third target weld zone section 243; or may mean a section located at a right short edge of the end cap 22 in the target weld zone 24, that is, the fourth target weld zone section 244. It is hereby noted that the first welding head 101 welds the section located at the rear long edge of the end cap 22, that is, the first target weld zone section 241, and the second welding head 102 welds the section located at the front long edge of the end cap 22, that is, the second target weld zone section 242. Nevertheless, in another embodiment, the first welding head 101 welds the section located at the left short edge of the end cap 22, that is, the third target weld zone section 243, and the second welding head 102 welds the section located at the right short edge of the end cap 22, that is, the fourth target weld zone section 244.

In the welding apparatus 100 according to this embodiment of this application, during welding, the housing 21 covered with an end cap 22 is fixed in the jig 103 first. At this time, the first welding head 101 and the second welding head 102 are located on two opposite sides of the housing 21 covered with the end cap 22 respectively. Subsequently, the first welding head 101 and the second welding head 102 weld the target weld zone sections 240 on the two opposite sides of the housing 21 covered with the end cap 22, respectively, thereby implementing concurrent welding of the two opposite sides of the housing 21 covered with the end cap 22, and improving the welding efficiency.

In an embodiment, as shown in FIG. 15 and FIG. 16, the welding apparatus 100 further includes a first driving piece 108 and a second driving piece 109. The second driving piece 109 is connected to the first driving piece 108. The first driving piece 108 moves along with the first welding head 101. The first driving piece 108 is configured to drive the first welding head 101 to move up and down to meet the welding requirements of the target weld zone sections 240 located at different heights on the end cap 22 and the housing 21. The second driving piece 109 is configured to drive the first driving piece 108 and the first welding head 101 to move forward and backward to adjust the spacing between the first welding head 101 and the target weld zone section 240 located at the rear side on the housing 21, so as to meet the welding requirements of the end caps 22 and the housings 21 that are of different sizes or that impose different welding requirements, and broaden the applicable range of the welding apparatus 100. The first driving piece 108 and the second driving piece 109 may be, but are not limited to, components capable of driving the first welding head 101 to move, such as a cylinder or a linear module.

In another embodiment, the welding apparatus 100 further includes a third driving piece 110 and a fourth driving piece 111. The third driving piece 110 is connected to the fourth driving piece 111. The third driving piece 110 moves along with the second welding head 102. The third driving piece 110 is configured to drive the second welding head 102 to move up and down to meet the welding requirements of the target weld zone sections 240 located at different heights on the end cap 22 and the housing 21. In addition, the fourth driving piece 111 is configured to drive the third driving piece 110 and the second welding head 102 to move forward and backward to adjust the spacing between the second welding head 102 and the target weld zone section 240 located at the front side on the end cap 22 and housing 21, so as to meet the welding requirements of the end caps 22 and the housings 21 that are of different sizes or that impose different welding requirements, and broaden the applicable range of the welding apparatus 100. The third driving piece 110 and the fourth driving piece 111 may be, but are not limited to, components capable of driving the second welding head 102 to move, such as a cylinder or a linear module.

Figure 17:
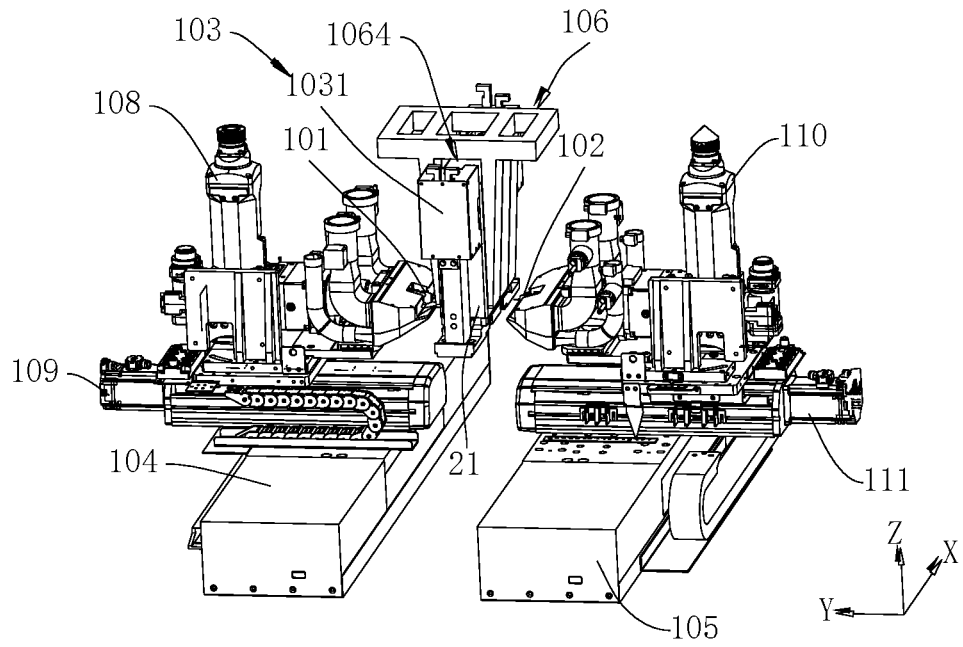
FIG. 17 is a schematic structural diagram of a welding apparatus from a viewing angle according to another embodiment of this application.
Figure 18:
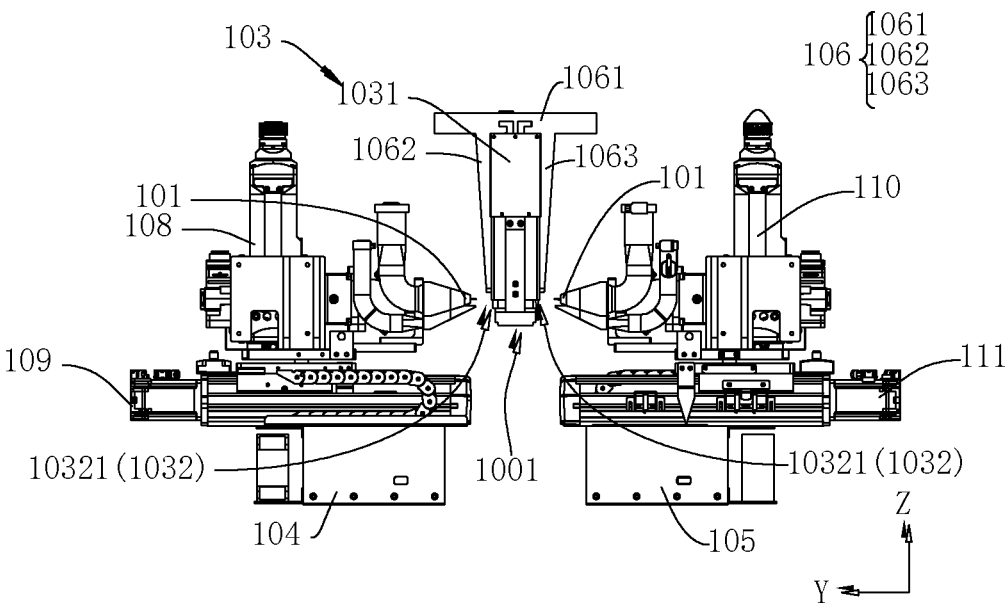
FIG. 18 is a schematic structural diagram of the welding apparatus shown in FIG. 17 from another viewing angle.

In another embodiment of this application, as shown in FIG. 17 and FIG. 18, the welding apparatus 100 further includes a first moving piece 104. The first moving piece 104 is connected to the first welding head 101 and configured to drive the first welding head 101 to move relative to the jig 103 so as to cause the first welding head 101 to weld a corresponding target weld zone section 240. The welding apparatus 100 further includes a second moving piece 105. The second moving piece 105 is connected to the second welding head 102 and configured to drive the second welding head 102 to move relative to the jig 103 so as to cause the second welding head 102 to weld a corresponding target weld zone section 240.

The first moving piece 104 means a power component capable of driving the first welding head 101 to move. For example, as shown in FIG. 7, FIG. 17, and FIG. 18, the first moving piece 104 drives the first welding head 101 to move left and right, so that the first welding head 101 moves along an extension direction of the long edge on the rear side of the end cap 22, thereby welding the long edge on the rear side of the end cap 22 and the long edge on the rear side of the opening of the housing 21 together. As an example, the first moving piece 104 may be a component capable of driving the first welding head 101 to move, such as a cylinder or a linear module.

The second moving piece 105 means a power component capable of driving the second welding head 102 to move. For example, as shown in FIG. 7, FIG. 17, and FIG. 18, the second moving piece 105 drives the second welding head 102 to move forward and backward, so that the second welding head 102 moves along an extension direction of the long edge on the front side of the end cap 22, thereby welding the long edge on the front side of the end cap 22 and the long edge on the front side of the opening of the housing 21 together. As an example, the second moving piece 105 may be a component capable of driving the second welding head 102 to move, such as a cylinder or a linear module.

In the welding apparatus 100 according to this embodiment of this application, during welding, the first moving piece 104 drives the first welding head 101 to move. At the same time, the second moving piece 105 drives the second welding head 102 to move. In this way, the first welding head 101 and the second welding head 102 move simultaneously relative to the jig 103, thereby simultaneously completing the welding of the target weld zone sections 240 on the two opposite sides of the end cap 22 and the housing 21. Furthermore, the first moving piece 104 and the second moving piece 105 drive the first welding head 101 and the second welding head 102 to move, respectively. The overall structure of the welding apparatus 100 is simple, and the welding apparatus is easy to process and manufacture.

In another embodiment of this application, as shown in FIG. 17 and FIG. 18, the welding apparatus 100 further includes a clamping mechanism 106. The clamping mechanism 106 is located at the welding station 1001 and configured to clamp and fix the housing 21.

The clamping mechanism 106 is a mechanism capable of clamping and fixing the housing 21. The clamping mechanism 106 may be a clamping mechanism 106 capable of clamping a component, such as a claw or a finger cylinder.

In the welding apparatus 100 according to this embodiment of this application, when the jig 103 is located between the first welding head 101 and the second welding head 102, the clamping mechanism 106 can be engaged outside the housing 21 to fix the housing 21, so as to implement the positioning of the housing 21. In this way, the first welding head 101 and the second welding head 102 can accurately weld the corresponding target weld zone sections 240, thereby improving the welding precision.

In another embodiment of this application, as shown in FIG. 17 and FIG. 18, the clamping mechanism 106 includes a fixing plate 1061 as well as a first side plate 1062 and a second side plate 1063 connected to the fixing plate 1061. The first side plate 1062, the second side plate 1063, and the fixing plate 1061 come together on all sides to form a clamping slot 1064. The clamping slot 1064 is configured to clamp the housing 21.

Serving as a mounting base for the first side plate 1062 and the second side plate 1063, the fixing plate 1061 is configured to support and fix the first side plate 1062 and the second side plate 1063.

The first side plate 1062 means a plate connected to one side of the fixing plate 1061. For example, as shown in FIG. 7 and FIG. 8, the fixing plate 1061 is a horizontally disposed plate, and the first side plate 1062 is a plate connected to the rear side of the fixing plate 1061.

The second side plate 1063 is a plate connected to the other side of the fixing plate 1061. For example, as shown in FIG. 7 and FIG. 8, the second side plate 1063 is a plate connected to the front side of the fixing plate 1061.

The clamping slot 1064 is a slot structure formed by the fixing plate 1061, the first side plate 1062, and the second side plate 1063 on all sides. The slot structure is configured to accommodate the housing 21 covered with the end cap 22. When the housing 21 is accommodated in the clamping slot 1064, the housing 21 covered with the end cap 22 is positioned and is in a stationary state, so that the first welding head 101 and the second welding head 102 can accurately weld the corresponding target weld zone 24, thereby improving the welding precision.

In the welding apparatus 100 according to this embodiment of this application, the clamping mechanism 106 is a structure including the fixing plate 1061, the first side plate 1062, and the second side plate 1063. The structure is simple, and the welding apparatus 100 is easy to manufacture and process.

In another embodiment, the connection between the first side plate 1062 and the fixing plate 1061, and the connection between the second side plate 1063 and the fixing plate 1061, may be implemented, but are not limited to, by bolting, bonding, snap-fitting, riveting, welding, one-piece molding, or the like. The one-piece molding means a process of forming a workpiece into one piece by means extrusion, injection molding, die-casting, or the like.

In another embodiment, the first side plate 1062 and the fixing plate 1061 are movably connected, so that the spacing between the first side plate 1062 and the second side plate 1063 is adjustable, and the housings 21 of different sizes can be clamped, thereby broadening the applicable range of the welding apparatus 100. As an example, a driving piece capable of driving the first side plate 1062 to move, such as a cylinder or a linear module, may be connected between the first side plate 1062 and the fixing plate 1061.

In another embodiment, the second side plate 1063 and the fixing plate 1061 may be movably connected, so that the spacing between the first side plate 1062 and the second side plate 1063 is adjustable, and the housings 21 of different sizes can be clamped, thereby broadening the applicable range of the welding apparatus 100. As an example, a driving piece capable of driving the second side plate 1063 to move, such as a cylinder or a linear module, may be connected between the second side plate 1063 and the fixing plate 1061.

In another embodiment, as shown in FIG. 17 and FIG. 18, the number of first side plates 1062 may be one or more. As an example, the number of first side plates 1062 is two. The two first side plates 1062 are distributed in tandem, so as to provide more positions of clamping and contact between the housing 21 and the clamping mechanism 106, and clamp the housing 21 more stably and more reliably. In other embodiments, the number of first side plates 1062 may be three, four, five or more. The specific number may be set according to the actual needs, and is not limited herein.

In another embodiment, the number of second side plates 1063 may be one or more. As an example, the number of second side plates 1063 is two. The two second side plates 1063 are distributed in tandem, so as to provide more positions of clamping and contact between the housing 21 and the clamping mechanism 106, and clamp the housing 21 more stably and more reliably. In other embodiments, the number of second side plates 1063 may be three, four, five or more. The specific number may be set according to the actual needs, and is not limited herein.

In another embodiment of this application, as shown in FIG. 17 and FIG. 18, the first side plate 1062 of the welding apparatus 100 is located between the first welding head 101 and the jig 103. The second side plate 1063 is located between the second welding head 102 and the jig 103.

The first side plate 1062 is located between the first welding mechanism and the jig 103. As shown in FIG. 17 and FIG. 18, the first side plate 1062 is located at the rear side of the housing 21.

The second side plate 1063 is located between the second welding mechanism and the jig 103. As shown in FIG. 17 and FIG. 18, the second side plate 1063 is located at the front side of the housing 21.

In the welding apparatus 100 according to this embodiment of this application, the first side plate 1062 is located between the first welding head 101 and the jig 103. The second side plate 1063 is located between the second welding head 102 and the jig 103. In this way, the front and rear of the housing 21 can be positioned by the first side plate 1062 and the second side plate 1063 respectively, and the spacing between the first welding head 101 and the corresponding target weld zone section 240 as well as the spacing between the second welding head 102 and the corresponding target weld zone section fall within an appropriate range, thereby improving the welding quality. In addition, referring to FIG. 21 to FIG. 23 together, the jig 103 can position the front and rear of the housing 21, and the clamping mechanism 106 can position the left and right of the housing 21, thereby implementing the positioning of the housing 21 on all sides. The positioning of the housing 21 is more accurate, and the welding quality is higher.

Figure 19:
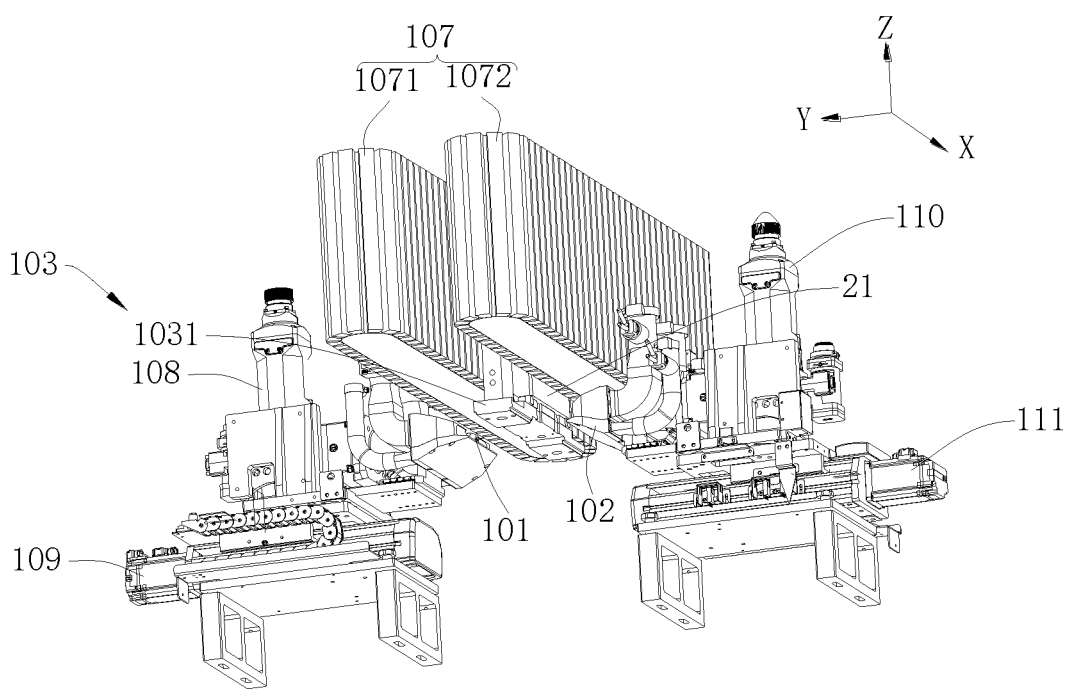
FIG. 19 is a schematic structural diagram of a welding apparatus from a viewing angle according to still another embodiment of this application.
Figure 20:
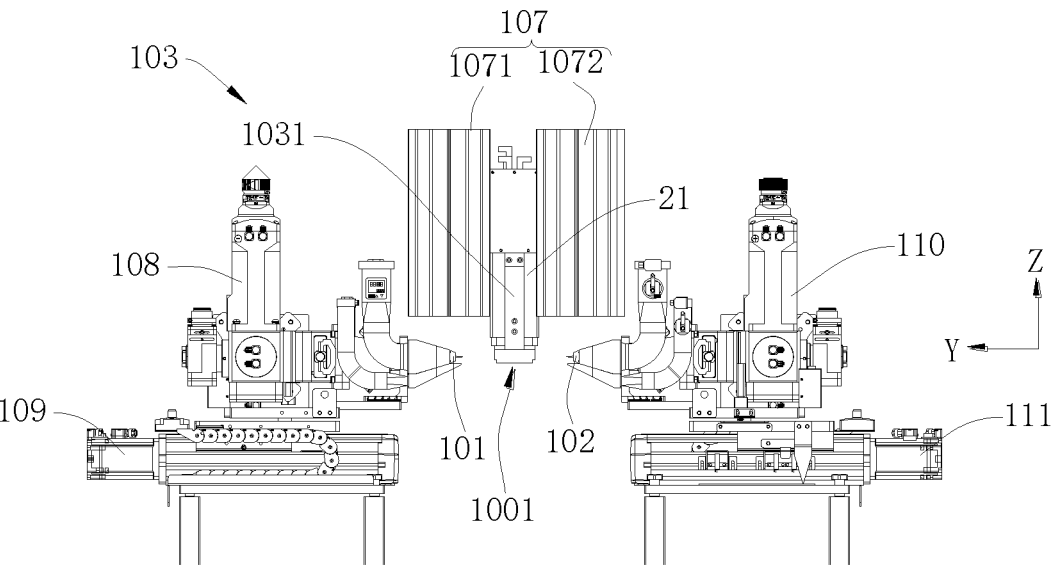
FIG. 20 is a schematic structural diagram of the welding apparatus shown in FIG. 20 from another viewing angle.

In another embodiment of this application, as shown in FIG. 19 and FIG. 20, the welding apparatus 100 further includes a moving mechanism 107. The moving mechanism 107 is configured to drive the jig 103 to move, so as to cause the first welding head 101 to weld a corresponding target weld zone section 240 and cause the second welding head 102 to weld a corresponding target weld zone section 240.

The moving mechanism 107 means a component capable of driving the jig 103 to move. The housing 21 moves along with the jig during movement of the jig 103. At the same time, the first welding head 101 and the second welding head 102 are in a static state. When the jig 103 drives the housing 21 to move, the welding positions of the first welding head 101 and the second welding head 102 on the housing 21 change, thereby implementing the welding of the target weld zone sections 240. As shown in FIG. 9 and FIG. 10, the moving mechanism 107 can drive the housing 21 covered with the end cap 22 to move left and right. In this way, the first welding head 101 and the second welding head 102 are caused to weld the long edges located at the front side and the rear side of the end cap 22 respectively, so as to weld the long edges at the left and right long edges of the end cap 22 to the corresponding long edges of the opening of the housing 21, and implement the welding of the long edges of the end cap 22. As an example, the moving mechanism 107 may be a component capable of driving the jig 103 to move, such as a cylinder or a linear module.

In the welding apparatus 100 according to this embodiment of this application, the first welding head 101 and the second welding head 102 are stationary, but the jig 103 is moving. Therefore, in an actual welding process, the first welding head 101 and the second welding head 102 can implement the welding directly without stopping the jig 103, thereby greatly improving the welding efficiency. In addition, during welding, the first welding head 101 is stationary relative to the second welding head 102, without a need to move, thereby improving the accuracy of the welding position, and improving the welding precision.

In another embodiment of this application, as shown in FIG. 19 and FIG. 20, the moving mechanism 107 of the disclosed welding apparatus 100 includes a first conveyor belt assembly 1071 and a second conveyor belt assembly 1072 that are spaced apart. The first conveyor belt assembly 1071 and the second conveyor belt assembly 1072 are able to clamp the housing 21 and cause the housing 21 to move as conveyed by the first conveyor belt assembly 1071 and the second conveyor belt assembly 1072.

The first conveyor belt assembly 1071 means a conveyor belt assembly configured to convey the housing 21. For example, as shown in FIG. 19 and FIG. 20, the first conveyor belt assembly 1071 means a conveyor belt assembly located at the rear side of the jig 103. The first conveyor belt assembly 1071 includes a driving piece, a transmission piece, and a conveyor belt. The conveyor belt is sheathed around the transmission piece. The driving piece drives the transmission piece to rotate, so as to move the conveyor belt and move the housing 21 located between the first conveyor belt and the second conveyor belt. The transmission piece may be a component such as a conveyor roller or a conveyor wheel. The driving piece may be a component such as an electric machine or a motor. The conveyor belt may be a conveyor crawler belt, a synchronous belt, or the like.

The second conveyor belt assembly 1072 means a conveyor belt assembly configured to convey the housing 21. For example, as shown in FIG. 19 and FIG. 20, the second conveyor belt assembly 1072 means a conveyor belt assembly located at the front side of the jig 103. The structure of the second conveyor belt assembly 1072 may be identical to the structure of the first conveyor belt assembly, and may be learned by reference to the structure of the first conveyor belt assembly 1071 described above. Nevertheless, in other embodiments, the structure of the second conveyor belt assembly 1072 may be different from the structure of the first conveyor belt assembly 1071, without being limited herein.

The first conveyor belt assembly 1071 and the second conveyor belt assembly 1072 are able to clamp the housing 21 and cause the housing 21 to move as conveyed by the first conveyor belt assembly 1071 and the second conveyor belt assembly 1072. Understandably, when the jig 103 that holds the housing moves between the first conveyor belt assembly 1071 and the second conveyor belt assembly 1072, the first conveyor belt assembly 1071 and the second conveyor belt assembly 1072 are able to clamp the housing 21. The housing 21 moves along the jig left and right as conveyed by the first conveyor belt assembly 1071 and the second conveyor belt assembly 1072, thereby implementing the welding of the target weld zone section 240.

In the welding apparatus 100 according to this embodiment of this application, during welding, the jig 103 moves to a position between the first conveyor belt assembly 1071 and the second conveyor belt assembly 1072, and drives the housing 21 in the jig 103 to move as conveyed by the first conveyor belt assembly 1071 and the second conveyor belt assembly 1072, so as to implement the welding of the target weld zone section 240. The first conveyor belt assembly 1071 and the second conveyor belt assembly 1072 clamp the housing 21 and also serve to position the housing 21, thereby improving the welding precision. In addition, by means of the structure in which the housing 21 is conveyed by the first conveyor belt assembly 1071 and the second conveyor belt assembly 1072, the first conveyor belt assembly 1071 and the second conveyor belt assembly 1072 contact and constrain the two opposite sides of the housing 21, so that the positioning precision is higher, and the welding accuracy is higher.

In another embodiment of this application, as shown in FIG. 21 and FIG. 23, a pressing plate 10311 and a receptacle 10312 for accommodating the housing 21 covered with the end cap 22 are created on the jig 103 of the welding apparatus 100 disclosed herein. The pressing plate 10311 is located at an opening of the receptacle 10312 and pressed against the housing 21 to push the housing 21 toward the end cap 22 so as to press and fix the end cap 22 to the housing 21.

In the actual welding process, relative movement is prone to occur between the housing 21 and the end cap 22 during the movement, thereby resulting in the problem of a low welding precision such as an offset of the welding position. In order to solve this problem, a pre-welding manner is usually employed. In other words, before the housing 21 covered with the end cap 22 is moved to the welding position, the end cap 22 is welded to the housing 21 preliminarily so that the end cap 22 and the housing 21 are relatively fixed without moving, thereby improving the accuracy of the subsequent welding. However, the pre-welding increases the welding steps, and reduces the welding efficiency.

In the jig 103, a pressing plate 10311 and a receptacle 10312 for accommodating the housing 21 covered with the end cap 22 are created. The receptacle 10312 provides a mounting space for the housing 21 covered with the end cap 22.

The pressing plate 10311 is located at the opening of the receptacle 10312, and is pressed against the housing 21 to push the housing 21 toward the end cap 22, so as to press and fix the end cap 22 to the housing 21. Understandably the pressing plate 10311 is located at the opening of the receptacle 10312, and the end cap 22 is located at the bottom of the receptacle 10312. The pressing plate 10311 pushes the housing 21 toward the bottom of the receptacle 10312, so that the housing 21 and the end cap 22 are pressed and fixed together. In this way, the end cap 22 can be stably fixed to the housing 21, thereby avoiding the need of the pre-welding operation and improving the welding efficiency. In addition, the pressing effect of the pressing plate 10311 prevents relative movement from occurring between the housing 21 and the end cap 22 during the welding and movement, so that the housing 21 and the end cap 22 can be accurately welded together, and the welding precision is high. Moreover, the housing 21 is inverted on the end cap 22, and the opening of the housing 21 is disposed downward, so that foreign matters such as dust and welding slag are prevented from falling into the housing 21.

In an embodiment, the pressing plate 10311 may be connected to the jig 103 by, but without being limited to, screwing, snap-fitting, rotary connection, or the like. In another embodiment, the pressing plate 10311 and the jig 103 are a one-piece structure.

In an embodiment, as shown in FIG. 15 and FIG. 16, the jig 103 accommodates the housing 21 covered with an end cap 22. The first welding head 101, the first driving piece 108, and the second driving piece 109 are all located at the rear side of the housing 21. The second welding head 102, the third driving piece 110, and the fourth driving piece 111 are all located at the front side of the housing 21. Such a layout facilitates the arrangement of components. The first driving piece 108 is mounted on the second driving piece 109, and the first welding head 101 is mounted on the first driving piece 108. The first driving piece 108 drives the first welding head 101 to move up and down, and the second driving piece 109 drives the first welding head 101 to move forward and backward. The third driving piece 110 is mounted on the fourth driving piece 111, and the second welding head 102 is mounted on the third driving piece 110. The third driving piece 110 drives the second welding head 102 to move up and down, and the fourth driving piece 111 drives the second welding head 102 to move forward and backward. In addition, the jig 103 may be driven to move by a conveyance apparatus 210, thereby enabling the first welding head 101 and the second welding head 102 to move relative to the jig 103, and in turn, implementing the welding of the corresponding target weld zone sections 240. The structure is simple and facilitates processing and manufacturing.

In an embodiment, as shown in FIG. 17 and FIG. 18, the jig 103 accommodates the housing 21 covered with an end cap 22. The clamping mechanism 106 clamps the housing 21. The first welding head 101, the first driving piece 108, the second driving piece 109, and the first moving piece 104 are all located at the rear side of the housing 21. The second moving piece 105, the second welding head 102, the third driving piece 110, and the fourth driving piece 111 are all located at the front side of the housing 21. Such a layout facilitates the arrangement of components. The second driving piece 109 is mounted on the first moving piece 104, and the first driving piece 108 is mounted on the second driving piece 109. The first welding head 101 is mounted on the first driving piece 108. The first driving piece 108 drives the first welding head 101 to move up and down, the second driving piece 109 drives the first welding head 101 to move forward and backward, and the first moving piece 104 drives the first welding head 101 to move left and right, thereby implementing the welding of the corresponding target weld zone sections 240. The fourth driving piece 111 is mounted on a second moving piece 105, the third driving piece 110 is mounted on the fourth driving piece 111, and the second welding head 102 is mounted on the third driving piece 110. The third driving piece 110 drives the second welding head 102 to move up and down, the fourth driving piece 111 drives the second welding head 102 to move forward and backward, and the second moving piece 105 drives the second welding head 102 to move left and right, thereby implementing the welding of the corresponding target weld zone sections 240.

In an embodiment, as shown in FIG. 19 and FIG. 20, the jig 103 accommodates the housing 21 covered with an end cap 22. The housing 21 is clamped by the first conveyor belt assembly 1071 and the second conveyor belt assembly 1072. The first welding head 101, the first driving piece 108, the second driving piece 109, and the first conveyor belt assembly 1071 are all located at the rear side of the housing 21. The first conveyor belt assembly 1071 is located between the jig 103 and the first driving piece 108. The second conveyor belt assembly 1072, the second welding head 102, the third driving piece 110, and the fourth driving piece 111 are all located at the front side of the housing 21. The second conveyor belt assembly 1072 is located between the jig 103 and the third driving piece 110. Such a layout facilitates the arrangement of components. The second driving piece 109 is mounted on the first driving piece 104, the first driving piece 108 is mounted on the second driving piece 109, and the first welding head 101 is mounted on the first driving piece 108. The first driving piece 108 drives the first welding head 101 to move up and down, and the second driving piece 109 drives the first welding head 101 to move forward and backward. The fourth driving piece 111 is mounted on the second moving piece 105, the third driving piece 110 is mounted on the fourth driving piece 111, and the second welding head 102 is mounted on the third driving piece 110. The third driving piece 110 drives the second welding head 102 to move up and down, and the fourth driving piece 111 drives the second welding head 102 to move forward and backward. In addition, as conveyed by the first conveyor belt assembly 1071 and the second conveyor belt assembly 1072, the housing 21 moves left and right along with the conveyor belt assemblies, thereby implementing the welding of the corresponding target weld zone sections 240.

As shown in FIG. 5 to FIG. 14, an embodiment of this application provides a welding device 200, including the welding apparatus 100 disclosed above.

The welding device 200 according to this embodiment of this application employs the foregoing welding apparatus 100. The welding apparatus 100 is highly efficient, and can improve the welding efficiency of the welding device 200.

The welding device 200 according to this embodiment of this application employs all the technical solutions of all the preceding embodiments, and therefore, at least achieves all the beneficial effects brought by the technical solutions of the preceding embodiments, the details of which are omitted here.

As shown in FIG. 5 to FIG. 9, the welding device 200 according to another embodiment of this application further includes a conveyance apparatus 210, a first welding apparatus 220, and a second welding apparatus 230. The first welding apparatus 220 is the foregoing welding apparatus 100. The welding station 1001 in the first welding apparatus 220 is a first welding station 2201. The first welding head 101 and the second welding head 102 in the first welding apparatus 220 are able to weld the target weld zone sections 240 located on two opposite sides of the end cap 22, respectively. The second welding apparatus 230 is the foregoing welding apparatus 100. The welding station 1001 in the second welding apparatus 230 is a second welding station 2204. The first welding head 101 in the second welding apparatus 230 and the second welding head 102 in the second welding apparatus 230 are able to weld the target weld zone sections 240 located on two other opposite sides of the end cap 22, respectively. The conveyance apparatus 210 is able to move the jig 103 from the first welding station 2201 to the second welding station 2204.

The first welding apparatus 220 is a welding apparatus 100 configured to weld the end cap 22 and the housing 21 located at the first welding station 2201. For example, as shown in FIG. 5, the first welding apparatus 220 is configured to weld the two opposite long edges of the end cap 22, that is, the first target weld zone section 241 and the second target weld zone section 242.

The second welding apparatus 230 is a welding apparatus 100 configured to weld the end cap 22 and the housing 21 located at the second welding station 2204. For example, as shown in FIG. 5, the second welding apparatus 230 is configured to weld the two opposite short edges of the end cap 22, that is, the third target weld zone section 243 and the fourth target weld zone section 244.

In the welding device 200 according to this embodiment of this application, during welding, the conveyance apparatus 210 moves the jig 103 to the first welding station 2201. The first welding head 101 and the second welding head 102 in the first welding apparatus 220 weld the target weld zone sections 240 located on the two opposite sides of the end cap 22, respectively. After completion of the welding, the conveyance apparatus 210 moves the jig 103 to the second welding station 2204. The first welding head 101 (reference may be made to the third welding head 231 shown in FIG. 5) and the second welding head 102 (reference may be made to the fourth welding head 232 shown in FIG. 5) in the second welding apparatus 230 weld the target weld zone sections 240 located on the two other opposite sides of the end cap 22, thereby implementing the welding of the end cap 22 to the housing 21 for a complete circle. The first welding head 101 and second welding head 102 weld two opposite sides of the end cap 22 simultaneously, and the third welding head 231 and the fourth welding head 232 weld the two other opposite sides of the end cap 22 respectively, thereby achieving high welding efficiency.

For ease of description, the first welding head 101 in the second welding apparatus 230 is hereinafter referred to as a third welding head 231, and the second welding head 102 in the second welding apparatus 230 is hereinafter referred to as a fourth welding head 232.

In another embodiment of this application, as shown in FIG. 5 to FIG. 9, the welding device 200 includes a transit station 2203. The target weld zone section 240 welded by the first welding head 101 is a first target weld zone section 241, and the target weld zone section 240 welded by the second welding head 102 is a second target weld zone section 242. The target weld zone section 240 welded by the third welding head 231 is a third target weld zone section 243, and the target weld zone section 240 welded by the fourth welding head 232 is a fourth target weld zone section 244. The jig 103 includes a first sub-jig 1031 and a second sub-jig. The first sub-jig 1031 is configured to carry the housing 21 covered with the end cap 22. A first clearance sub-structure 10321 is created on two opposite sides of the first sub-jig 1031. The two first clearance sub-structures 10321 are available for exposing the first target weld zone section 241 and the second target weld zone section 242 respectively. The conveyance apparatus 210 can convey the first sub-jig 1031 from the first welding station 2201 into the transit station 2203. The second sub-jig is configured to carry the housing 21 covered with the end cap 22. A second clearance sub-structure is created on two opposite sides of the second sub-jig. The two second clearance sub-structures are available for exposing the third target weld zone section 243 and the fourth target weld zone section 244 respectively. The welding device 200 further includes a relocation apparatus. The relocation apparatus is configured to relocate the housing 21 covered with the end cap 22 into the second sub-jig, the housing being accommodated in the first sub-jig 1031 located in the transit station 2203. The conveyance apparatus 210 can convey the second sub-jig from the transit station 2203 into the second welding station 2204.

The relocation apparatus is an apparatus capable of taking out the housing 21 covered with the end cap 22 from the first sub-jig 1031 and placing the housing 21 taken out and covered with the end cap 22 into the second sub-jig. The relocation apparatus may be a device capable of picking up and placing items, such as a mechanical arm.

In the welding device 200 according to this embodiment of this application, during welding, the conveyance apparatus 210 conveys the first sub-jig 1031 to the first welding station 2201. The first welding head 101 and the second welding head 102 weld the first target weld zone section 241 and the second target weld zone section 242 through the two first clearance sub-structures 10321, respectively. Upon completion of the welding, the conveyance apparatus 210 conveys the first sub-jig 1031 to the transit station 2203. The relocation apparatus takes out the housing 21 covered with the end cap 22 from the first sub-jig 1031, and then places the housing 21 covered with the end cap 22 into the second sub-jig. Subsequently, the conveyance apparatus 210 conveys the second sub-jig to the second welding station 2204. The third welding head 231 and the fourth welding head 232 weld the third target weld zone section 243 and the fourth target weld zone section 244 through two second clearance sub-structures, respectively, thereby welding the end cap 22 to the housing 21 for a complete circle. In addition, the target weld zone 24 of the end cap 22 and the housing 21 is exposed in sections by using the first sub-jig 1031 and the second sub-jig separately, thereby making it unnecessary to sever the first sub-jig 1031 from the second sub-jig. The housing 21 covered with the end cap 22 is fixed in the jig 103 reliably, thereby improving the welding quality, reducing the difficulty of welding between the end cap 22 and the housing 21, and improving the effect of welding between the end cap 22 and the housing 21.

In another embodiment of this application, as shown in FIG. 5 to FIG. 9, the welding device 200 disclosed herein further includes a first trimming station 2202. The conveyance apparatus 210 can convey the first sub-jig 1031 from the first welding station 2201 into the first trimming station 2202. The welding device 200 further includes a first trimming apparatus. The first trimming apparatus can trim a first weld seam formed in the first target weld zone section 241 and a second weld seam formed in the second target weld zone section 242 in the first trimming station 2202.

In the welding device 200 according to this embodiment of this application, after completion of welding the first target weld zone section 241 and the second target weld zone section 242, a first weld structure is formed in the first target weld zone section 241, and a second weld structure is formed in the second target weld zone section 242. Subsequently, the conveyance apparatus 210 conveys the first sub-jig 1031 to the first trimming station 2202. The trimming apparatus trims the first weld structure and the second weld structure to rub off the part protruding beyond the end cap 22 and the housing 21 on the first weld structure and the second weld structure, so as to impart a good appearance to the end cap 22 and the housing 21 and reduce the risk of damage to other components.

In another embodiment of this application, as shown in FIG. 5 to FIG. 9, the welding device 200 disclosed herein further includes a second trimming station 2205. The conveyance apparatus 210 conveys the second sub-jig from the second welding station 2204 into the second trimming station 2205. The welding device 200 further includes a second trimming apparatus. The second trimming apparatus can trim a third weld seam formed in the third target weld zone section 243 and a fourth weld seam formed in the fourth target weld zone section 244 in the second trimming station 2205.

In the welding device 200 according to this embodiment of this application, after completion of welding the third target weld zone section 243 and the fourth target weld zone section 244, a third weld structure is formed in the third target weld zone section 243, and a fourth weld structure is formed in the fourth target weld zone section 244. Subsequently, the conveyance apparatus 210 conveys the second sub-jig to the second trimming station 2205. Afterward, the second trimming apparatus trims the third weld structure and the fourth weld structure to rub off the part protruding beyond the end cap 22 and the housing 21 on the third weld structure and the fourth weld structure, so as to impart a good appearance to the end cap 22 and the housing 21 and reduce the risk of damage to other components.

The welding device 200 according to this embodiment of this application may employ the technical solutions of one or several embodiments described above, and therefore, at least achieves all the beneficial effects brought by the technical solutions of such embodiments, the details of which are omitted here.

An embodiment of this application provides a battery cell 20. The battery cell 20 includes a housing 21 and an end cap 22. The end cap 22 covers and fits the housing 21. The end cap 22 is welded to the housing 21 by using the foregoing welding method.

In the battery cell 20 according to this embodiment of this application, the end cap 22 and the housing 21 are welded together by the above welding method. The welding efficiency is high, thereby improving the production efficiency of the battery cell 20 and reducing the manufacturing cost.

The battery cell 20 according to this embodiment of this application may employ the technical solutions of one or several embodiments described above, and therefore, at least achieves all the beneficial effects brought by the technical solutions of such embodiments, the details of which are omitted here.

The foregoing descriptions are merely exemplary embodiments of this application, but are not intended to limit this application. Any modifications, equivalent substitutions, and improvements made without departing from the spirit and principles of this application still fall within the protection scope of this application.

What is claimed is:

1. A welding method, comprising:

placing a housing covered with an end cap into a jig, the jig including a receptacle for accommodating the housing covered with the end cap and a pressing plate located at an opening of the receptacle, such that, after the placing, the housing is inverted on the end cap with the end cap located at a bottom of the receptacle and the pressing plate pressed against the housing to push the housing toward the end cap so as to press and fix the end cap to the housing, wherein a clearance structure is formed as openings arranged on opposite sides of the jig and available for exposing a target weld zone between the end cap and the housing, and the target weld zone comprises a first target weld zone section and a second target weld zone section located on two opposite sides of the end cap respectively; and moving the jig to a first welding station of a welding device; welding, by a first welding head of the welding device, the first target weld zone section through the clearance structure; and welding, by a second welding head of the welding device, the second target weld zone section through the clearance structure, wherein the first welding station is located between the first welding head and the second welding head.

2. The welding method according to claim 1, wherein the target weld zone comprises a plurality of target weld zone sections, one welding head is disposed corresponding to each target weld zone section, the plurality of target weld zone sections are connected in tandem and come together on all sides to form a ring structure, two of the plurality of target weld zone sections are the first target weld zone section and the second target weld zone section respectively, the welding head corresponding to the first target weld zone section is the first welding head, and the welding head corresponding to the second target weld zone section is the second welding head.

3. The welding method according to claim 2, wherein welding directions of two welding heads corresponding to a pair of opposite target weld zone sections among the plurality of target weld zone sections are opposite to each other.

4. The welding method according to claim 2, wherein, in any two adjacent target weld zone sections among the plurality of target weld zone sections, a welding start point of one target weld zone section is connected to a welding end point of the other target weld zone section.

5. The welding method according to claim 2, wherein welding directions of two welding heads corresponding to a pair of opposite target weld zone sections among the plurality of target weld zone sections are identical.

6. The welding method according to claim 2, wherein at least one welding head welds a corresponding target weld zone section along a first direction and then welds the corresponding target weld zone section along a reverse direction.

7. The welding method according to claim 6, wherein a welding stop position is created in the target weld zone section, the welding head stops welding at the welding stop position after welding from one end of the target weld zone section to the welding stop position along the first direction, and then the welding head welds along the reverse direction to complete welding of an unwelded region on the target weld zone section.

8. The welding method according to claim 7, wherein the welding head continues to weld along the reverse direction after moving to the welding stop position during welding along the reverse direction.

9. The welding method according to claim 1, wherein:

the target weld zone further comprises a third target weld zone section and a fourth target weld zone section located on two other opposite sides of the end cap, the first target weld zone section comprises a first end and a second end opposite to each other, the second target weld zone section comprises a third end and a fourth end opposite to each other, the third target weld zone section is connected between the first end and the third end, and the fourth target weld zone section is connected between the second end and the fourth end; and the welding device further comprises a third welding head and a fourth welding head, and a second welding station is formed between the third welding head and the fourth welding head; and the welding method further comprising:

moving the jig to the second welding station;

welding, by the third welding head, the third target weld zone section through the clearance structure; and welding, by the fourth welding head, the fourth target weld zone section through the clearance structure.

10. The welding method according to claim 9, wherein:

the first welding head welds the first target weld zone section along a distribution direction from the first end toward the second end, and the second welding head welds the second target weld zone section along a distribution direction from the fourth end toward the third end; and the third welding head welds the third target weld zone section along a distribution direction from the third end toward the first end, and the fourth welding head welds the fourth target weld zone section along a distribution direction from the second end toward the fourth end.

11. The welding method according to claim 9, wherein:

the first welding head welds the first target weld zone section along a distribution direction from the first end toward the second end, and the second welding head welds the second target weld zone section along a distribution direction from the third end toward the fourth end; and the third welding head welds the third target weld zone section along a distribution direction from the first end toward the third end, and the fourth welding head welds the fourth target weld zone section along a distribution direction from the second end toward the fourth end.

12. The welding method according to claim 11, wherein:

after welding the second target weld zone section along a distribution direction from the third end toward the fourth end, the second welding head welds the second target weld zone section toward the third end along a reverse direction; and/or after welding the fourth target weld zone section along a distribution direction from the second end toward the fourth end, the fourth welding head welds the fourth target weld zone section toward the second end along a reverse direction.

\* \* \* \* \*